United States Patent
Hara et al.

(10) Patent No.: US 10,618,589 B2
(45) Date of Patent: Apr. 14, 2020

(54) BICYCLE SEATPOST ASSEMBLY

(71) Applicant: SHIMANO INC., Sakai (JP)

(72) Inventors: Nobukatsu Hara, Sakai (JP); Hiroshi Matsuda, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/851,688

(22) Filed: Dec. 21, 2017

(65) Prior Publication Data
US 2019/0193802 A1    Jun. 27, 2019

(51) Int. Cl.
| | | |
|---|---|---|
| *B62J 1/08* | (2006.01) | |
| *B62J 99/00* | (2020.01) | |
| *B62M 25/08* | (2006.01) | |
| *B62M 9/122* | (2010.01) | |
| *G08C 17/00* | (2006.01) | |
| *B62K 23/00* | (2006.01) | |
| *G08C 17/02* | (2006.01) | |
| *B62M 25/00* | (2006.01) | |

(52) U.S. Cl.
CPC ............. *B62J 99/00* (2013.01); *B62J 1/08* (2013.01); *B62K 23/00* (2013.01); *B62M 9/122* (2013.01); *B62M 25/08* (2013.01); *G08C 17/00* (2013.01); *G08C 17/02* (2013.01); *B62J 2001/085* (2013.01); *B62J 2099/004* (2013.01); *B62M 2025/006* (2013.01)

(58) Field of Classification Search
CPC ............................ B62J 2001/085; B62J 1/08
See application file for complete search history.

(56) References Cited

U.S. PATENT DOCUMENTS

| | | | |
|---|---|---|---|
| 9,540,063 B1 | 1/2017 | Shirai | |
| 2013/0138302 A1* | 5/2013 | Hara | B62J 1/08 |
| | | | 701/49 |
| 2013/0221713 A1* | 8/2013 | Pelot | B62J 1/02 |
| | | | 297/15.13 |
| 2017/0096186 A1* | 4/2017 | Lai | B62J 1/08 |
| 2017/0274949 A1* | 9/2017 | Pittens | B62J 1/02 |
| 2017/0341692 A1* | 11/2017 | Shirai | B62J 1/08 |
| 2017/0341705 A1* | 11/2017 | Tsuchizawa | B62J 1/08 |
| 2018/0001953 A1* | 1/2018 | Winefordner | B62J 1/08 |
| 2018/0079462 A1* | 3/2018 | Shirai | B62K 25/08 |
| 2018/0186419 A1* | 7/2018 | Shipman | B62J 1/08 |
| 2018/0194418 A1* | 7/2018 | Bowers | B62J 1/08 |
| 2018/0244330 A1* | 8/2018 | Shirai | B62J 1/08 |
| 2018/0257737 A1* | 9/2018 | Komatsu | B62K 25/08 |
| 2018/0273123 A1* | 9/2018 | Eberlberger | B62K 19/36 |
| 2018/0274562 A1* | 9/2018 | Chambers | F15B 7/08 |
| 2018/0334212 A1* | 11/2018 | Bowers | B62J 1/04 |

FOREIGN PATENT DOCUMENTS

| | | |
|---|---|---|
| DE | 102016011108 | 4/2017 |
| EP | 2657113 | 10/2013 |

* cited by examiner

*Primary Examiner* — Timothy J Brindley
(74) *Attorney, Agent, or Firm* — Mori & Ward, LLP

(57) ABSTRACT

A bicycle seatpost assembly comprises an electric actuator and a seatpost controller. The electric actuator is to change a state of the bicycle seatpost assembly between a lock state where a total length of the bicycle seatpost assembly is invariable, and an adjustable state where the total length of the bicycle seatpost assembly is variable. The seatpost controller is configured to control the electric actuator to maintain the adjustable state during an adjustment period selectable from a plurality of predetermined adjustment periods.

18 Claims, 31 Drawing Sheets

BICYCLE SEATPOST ASSEMBLY

BACKGROUND OF THE INVENTION

Field of the Invention

The present invention relates to a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a seatpost assembly.

SUMMARY OF THE INVENTION

In accordance with a first aspect of the present invention, a bicycle seatpost assembly comprises an electric actuator and a seatpost controller. The electric actuator is to change a state of the bicycle seatpost assembly between a lock state where a total length of the bicycle seatpost assembly is invariable, and an adjustable state where the total length of the bicycle seatpost assembly is variable. The seatpost controller is configured to control the electric actuator to maintain the adjustable state during an adjustment period selectable from a plurality of predetermined adjustment periods.

With the bicycle seatpost assembly according to the first aspect, it is possible to change the adjustment period to a preferable period for the rider.

In accordance with a second aspect of the present invention, the bicycle seatpost assembly according to the first aspect further comprises a seatpost memory configured to store the adjustment period.

With the bicycle seatpost assembly according to the second aspect, it is possible to change the adjustment period to the preferable period for the rider by changing the setting of the bicycle seatpost assembly.

In accordance with a third aspect of the present invention, the bicycle seatpost assembly according to the second aspect is configured so that the seatpost memory is configured to communicate with an external device and is configured to store the adjustment period selected from the plurality of predetermined adjustment periods by using the external device.

With the bicycle seatpost assembly according to the third aspect, it is possible to change the adjustment period to the preferable period for the rider via the external device.

In accordance with a fourth aspect of the present invention, the bicycle seatpost assembly according to the second or third aspect is configured so that the seatpost memory is configured to store the plurality of predetermined adjustment periods.

With the bicycle seatpost assembly according to the fourth aspect, it is possible to select the adjustment period from the plurality of predetermined adjustment periods stored in the seatpost memory.

In accordance with a fifth aspect of the present invention, the bicycle seatpost assembly according to the fourth aspect is configured so that the seatpost memory is configured to communicate with an external device. The seatpost controller is configured to control the electric actuator based on the adjustment period selected from the plurality of predetermined adjustment periods by using the external device.

With the bicycle seatpost assembly according to the fifth aspect, it is possible to change the adjustment period to the preferable period for the rider by selecting the adjustment period via the external device from the plurality of predetermined adjustment periods stored in the seatpost memory.

In accordance with a sixth aspect of the present invention, the bicycle seatpost assembly according to the fourth or fifth aspect is configured so that the plurality of predetermined adjustment periods includes a first adjustment period and a second adjustment period. The seatpost controller has a first control mode to control the electric actuator based on the first adjustment period, and a second control mode to control the electric actuator based on the second adjustment period. The seatpost controller is configured to change a mode of the seatpost controller between the first control mode and the second control mode.

With the bicycle seatpost assembly according to the sixth aspect, it is possible to change the adjustment period by changing the mode of the seatpost controller between the first control mode and the second control mode.

In accordance with a seventh aspect of the present invention, the bicycle seatpost assembly according to the sixth aspect is configured so that the seatpost controller is configured to change the mode of the seatpost controller between the first control mode and the second control mode based on an input from a remote controller.

With the bicycle seatpost assembly according to the seventh aspect, it is possible to change the mode of the seatpost controller at the rider's hand.

In accordance with an eighth aspect of the present invention, the bicycle seatpost assembly according to any one of the first to seventh aspects is configured so that the seatpost controller is configured to control the electric actuator to maintain the adjustable state during the adjustment period based on a control signal from a remote controller. The control signal includes adjustment information relating to the adjustment period.

With the bicycle seatpost assembly according to the eighth aspect, it is possible to change the adjustment period with the remote controller without changing the setting of the bicycle seatpost assembly.

In accordance with a ninth aspect of the present invention, the bicycle seatpost assembly according to the eighth aspect is configured so that the remote controller includes a remote memory storing the adjustment information.

With the bicycle seatpost assembly according to the ninth aspect, it is possible to change the adjustment period with the remote controller without changing the setting of the bicycle seatpost assembly.

In accordance with a tenth aspect of the present invention, the bicycle seatpost assembly according to the ninth aspect is configured so that the seatpost controller is configured to control the electric actuator based on the adjustment period selected by using the remote controller from the plurality of predetermined adjustment periods stored in the remote memory.

With the bicycle seatpost assembly according to the tenth aspect, it is possible to change the adjustment period only with the remote controller.

In accordance with an eleventh aspect of the present invention, the bicycle seatpost assembly according to the ninth or tenth aspect is configured so that the plurality of predetermined adjustment periods includes a first adjustment period and a second adjustment period. The remote controller has a first signal transmitting mode to transmit a first control signal including first adjustment information relating to the first adjustment period, and a second signal transmitting mode to transmit a second control signal including second adjustment information relating to the second adjustment period. The remote controller is configured to change a mode of the remote controller between the first signal transmitting mode and the second signal transmitting mode.

With the bicycle seatpost assembly according to the eleventh aspect, it is possible to change the adjustment period by changing the mode of the seatpost controller between the first signal transmitting mode and the second signal transmitting mode.

In accordance with a twelfth aspect of the present invention, the bicycle seatpost assembly according to the eleventh aspect is configured so that the remote controller is configured to change the mode of the remote controller between the first signal transmitting mode and the second signal transmitting mode based on a mode user input received by the remote controller.

With the bicycle seatpost assembly according to the twelfth aspect, it is possible to change the mode of the remote controller at the rider's hand.

In accordance with a thirteenth aspect of the present invention, the bicycle seatpost assembly according to any one of the ninth to thirteenth aspects is configured so that the remote controller is configured to communicate with an external device. The seatpost controller is configured to control the electric actuator based on the adjustment period selected by using the external device from the plurality of predetermined adjustment periods stored in the remote memory.

With the bicycle seatpost assembly according to the thirteenth aspect, it is possible to change the adjustment period with the external device.

In accordance with a fourteenth aspect of the present invention, the bicycle seatpost assembly according to any one of the eighth to thirteenth aspects is configured so that the adjustment information includes a signal length of the control signal. The seatpost controller is configured to control the electric actuator based on a receipt period of the control signal having the length of period.

With the bicycle seatpost assembly according to the fourteenth aspect, it is possible to change the adjustment period with the remote controller without changing the setting of the bicycle seatpost assembly.

In accordance with a fifteenth aspect of the present invention, the bicycle seatpost assembly according to any one of the eighth to thirteenth aspects is configured so that the seatpost controller is configured to control the electric actuator to maintain the adjustable state during the adjustment period based on the control signal having a constant length regardless of the adjustment information.

With the bicycle seatpost assembly according to the fifteenth aspect, it is possible to make a transmission time of the control signal shorter since the transmission time is independent from the adjustment period.

In accordance with a sixteenth aspect of the present invention, the bicycle seatpost assembly according to any one of the first to fifteenth aspects further comprises a positioning structure. The positioning structure includes a passageway and a hydraulic valve to open and close the passageway. The positioning structure has an open state where the hydraulic valve opens the passageway, and a closed state where the hydraulic valve closes the passageway. The seatpost controller is configured to control the electric actuator to maintain the open state during the adjustment period.

With the bicycle seatpost assembly according to the sixteenth aspect, it is possible to change the adjustment period during which the positioning structure maintains the open state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
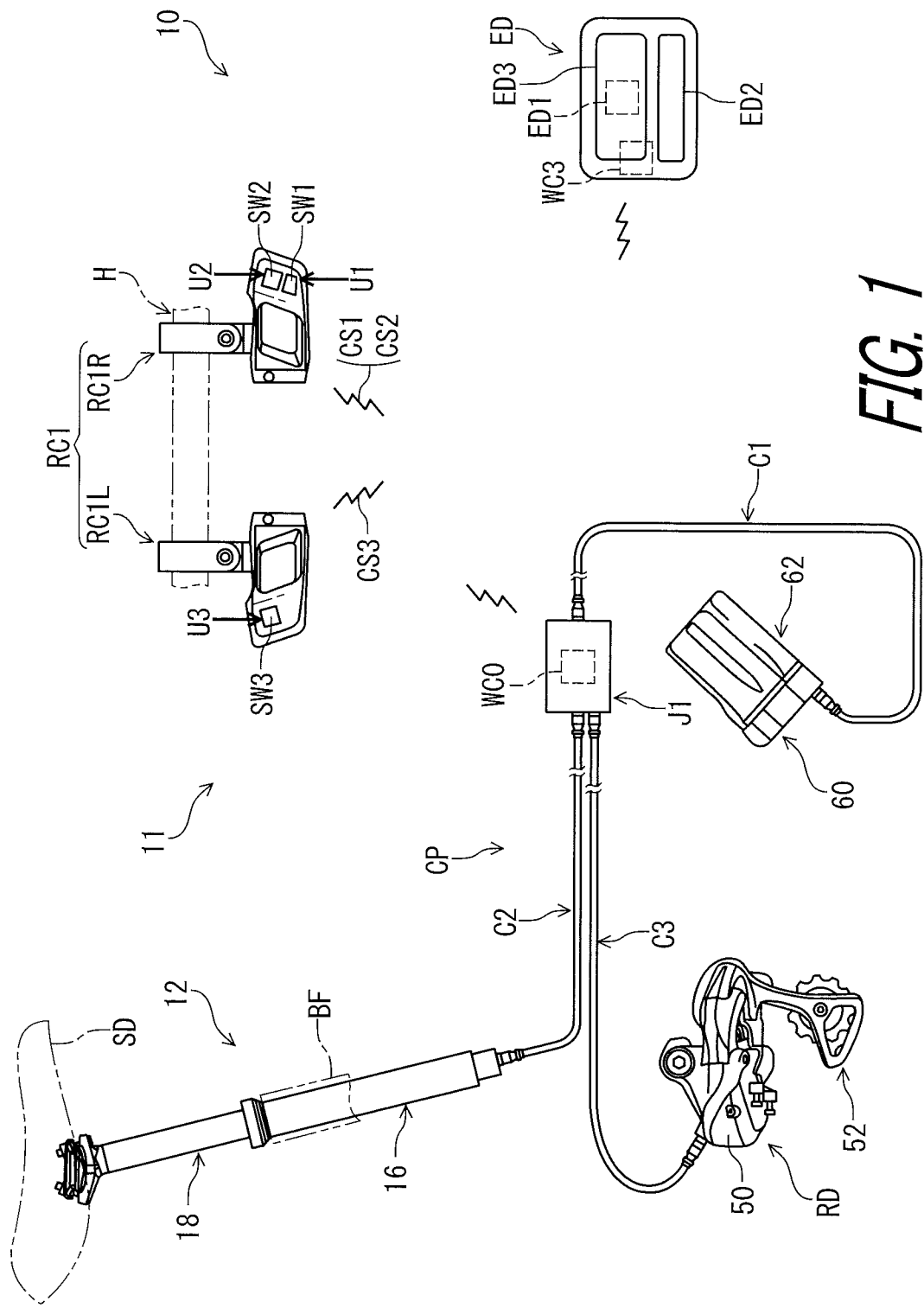
FIG. 1 is a schematic diagram of a bicycle control system including a bicycle seatpost assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle control system 10 includes a bicycle seatpost system 11, a rear derailleur RD, and an electric communication path CP. The bicycle seatpost system 11 includes a bicycle seatpost assembly 12 and a remote controller RC1. A saddle SD is attached to the bicycle seatpost assembly 12. The remote controller RC1 is configured to be mounted on a bicycle body such as a bicycle handlebar H to allow a user (e.g., a rider) to operate the remote controller RC1. The remote controller RC1 is configured to be wirelessly connected to the bicycle seatpost assembly 12 to operate the bicycle seatpost assembly 12 in response to a seatpost user input U1. The remote controller RC1 is configured to be wirelessly connected to the rear derailleur RD to operate the rear derailleur RD in response to one of an upshift user input U2 and a downshift user input U3.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle SD of a bicycle with facing the bicycle handlebar H. Accordingly, these terms, as utilized to describe the bicycle seatpost assembly 12, should be interpreted relative to the bicycle equipped with the bicycle seatpost assembly 12 as used in an upright riding position on a horizontal surface.

As seen in FIG. 1, the remote controller RC1 includes a seatpost operating switch SW1, an upshift operating switch SW2, and a downshift operating switch SW3. The seatpost operating switch SW1 is configured to generate a seatpost control signal CS1 in response to the seatpost user input U1. The upshift operating switch SW2 is configured to generate an upshift control signal CS2 in response to the upshift user input U2. The downshift operating switch SW3 is configured to generate a downshift control signal CS3 in response to the downshift user input U3. In this embodiment, the remote controller RC1 includes a first operating device RC1R and a second operating device RC1L. The first operating device RC1R and the second operating device RC1L are mounted on the bicycle handlebar H. The seatpost operating switch SW1 and the upshift operating switch SW2 are provided in the first operating device RC1R. The downshift operating switch SW3 is provided in the second operating device RC1L. However, the arrangement of these switches is not limited to this embodiment. For example, it is possible to provide the seatpost operating switch SW1 to be separated from the upshift operating switch SW2 and the downshift operating switch SW3. The first operating device RC1R is a right-hand operating device, and the second operating device RC1L is a left-hand operating device. However, the arrangement and/or the structure of the first operating device RC1R and the second operating device RC1L is not limited to this embodiment. For example, it is possible to provide the upshift operating switch SW2 and the downshift operating switch SW3 in a single operating device.

Figure 2:
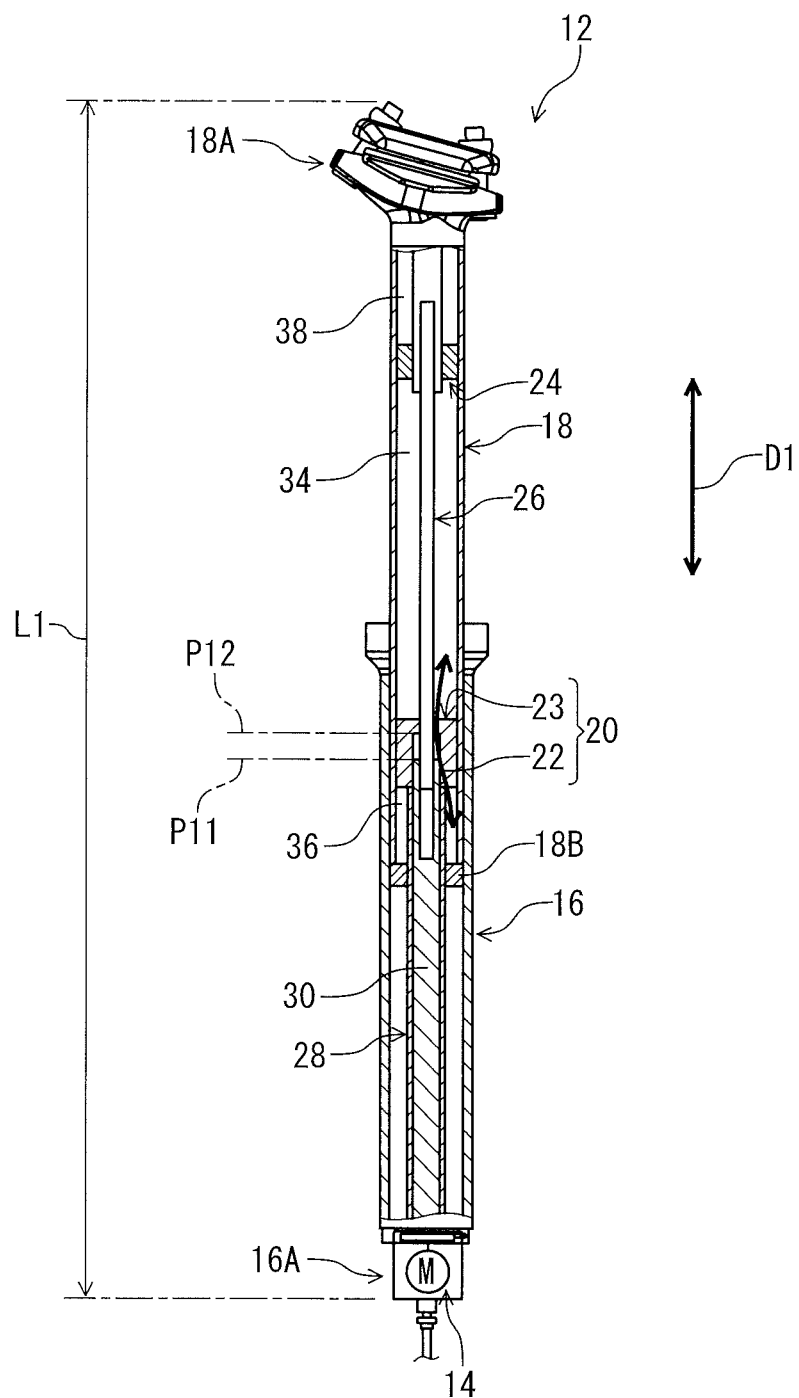
FIG. 2 is a cross-sectional view of the bicycle seatpost assembly illustrated in FIG. 1.

As seen in FIG. 2, the bicycle seatpost assembly 12 comprises an electric actuator 14 to change a state of the bicycle seatpost assembly 12 between a lock state where a total length L1 of the bicycle seatpost assembly 12 is invariable, and an adjustable state where the total length L1 of the bicycle seatpost assembly 12 is variable. The bicycle seatpost assembly 12 comprises a first tube 16 and a second tube 18. The second tube 18 is provided in the first tube 16 movably in a telescopic direction D1. The first tube 16 includes a first end 16A. The second tube 18 includes a second end 18A. The first end 16A and the second end 18A define the total length L1 of the bicycle seatpost assembly 12. The first tube 16 is secured to a bicycle frame BF (FIG. 1) by a conventional clamping arrangement (not shown). The saddle SD (FIG. 1) is attached to the second end 18A of the second tube 18. In this embodiment, the electric actuator 14 is attached to the first tube 16. However, the electric actuator 14 can be attached to the second tube 18.

As seen in FIG. 2, the bicycle seatpost assembly 12 further comprises a positioning structure 20. The positioning structure 20 includes a passageway 22 and a hydraulic valve 23 to open and close the passageway 22. The positioning structure 20 has an open state where the hydraulic valve 23 opens the passageway 22, and a closed state where the hydraulic valve 23 closes the passageway 22.

In this embodiment, the bicycle seatpost assembly 12 comprises a floating piston 24, a rod 26, a guide member 28, and a flow control part 30. The hydraulic valve 23 divides an interior bore of the first tube 16 into a first fluid chamber 34 and a second fluid chamber 36. The flow control part 30 is provided in the guide member 28 so that the hydraulic valve 23 moves relative to the flow control part 30 between a closed position P11 and an open position P12 in the telescopic direction D1. The hydraulic valve 23 is biased by a biasing element (not shown) toward the closed position P11.

In this embodiment, the electric actuator 14 is mechanically coupled to the hydraulic valve 23 to move the hydraulic valve 23 between the closed position P11 and the open position P12. In this embodiment, the electric actuator 14 includes a direct current (DC) motor. The electric actuator 14 includes a rotational shaft (not shown) to output a rotational force. The rotational shaft is coupled to the hydraulic valve 23 via a gear reducer (not shown). Other examples of the electric actuator 14 include a stepper motor, an alternating current (AC) motor, and an electromagnetic solenoid.

The passageway 22 is closed by the hydraulic valve 23 when the hydraulic valve 23 is positioned at the closed position P11. The passageway 22 is open by the hydraulic valve 23 when the hydraulic valve 23 is positioned at the open position P12. When the hydraulic valve 23 is closed, the second tube 18 is positioned relative to the first tube 16 in the telescopic direction D1. In other words, when the hydraulic valve 23 is closed, position of the second tube 18 is fixed relative to the first tube 16 in the telescopic direction D1. When the hydraulic valve 23 is open, the second tube 18 is movable relative to the first tube 16 in the telescopic direction D1. In other words, when the hydraulic valve 23 is open, position of the second tube 18 can be changed relative to the first tube 16 in the telescopic direction D1. Thus, the closed position P11 of the flow control part 30 corresponds to the closed state of the positioning structure 20 and the lock state of the bicycle seatpost assembly 12. The open position P12 of the flow control part 30 corresponds to the open state of the positioning structure 20 and the adjustable state of the bicycle seatpost assembly 12. Namely, moving the hydraulic valve 23 changes the state of the bicycle seatpost assembly 12 between the lock state and the adjustable state.

The hydraulic valve 23 is coupled to the first tube 16 via the guide member 28 to move together relative to the second tube 18. The first fluid chamber 34 is disposed between the hydraulic valve 23 and the floating piston 24. The second fluid chamber 36 is disposed between the hydraulic valve 23 and a lower end 18B of the second tube 18. The flow control part 30 cooperates with the guide member 28 and the hydraulic valve 23 to control flow of fluid between the first fluid chamber 34 and the second fluid chamber 36 to change a position of the first tube 16 relative to the second tube 18.

The floating piston 24 is disposed in the interior bore of the second tube 18 and forms a gas chamber 38 disposed between the floating piston 24 and an upper end of the second tube 18. The shorter total length of the bicycle seatpost assembly 12 increases an inner pressure of the gas chamber 38. When the hydraulic valve 23 is open in a state where the rider's weight applies to the second tube 18, the second tube 18 is movable relative to the first tube 16 to decrease the total length L1 against the inner pressure of the gas chamber 38. When the hydraulic valve 23 is open in a state where the rider's weight does not apply to the second tube 18, the second tube 18 is movable relative to the first tube 16 to increase the total length L1 because of the inner pressure of the gas chamber 38. The bicycle seatpost assembly 12 includes structures which have been known in the bicycle field, they will not be described and/or illustrated in detail here for the sake of brevity.

Figure 3:
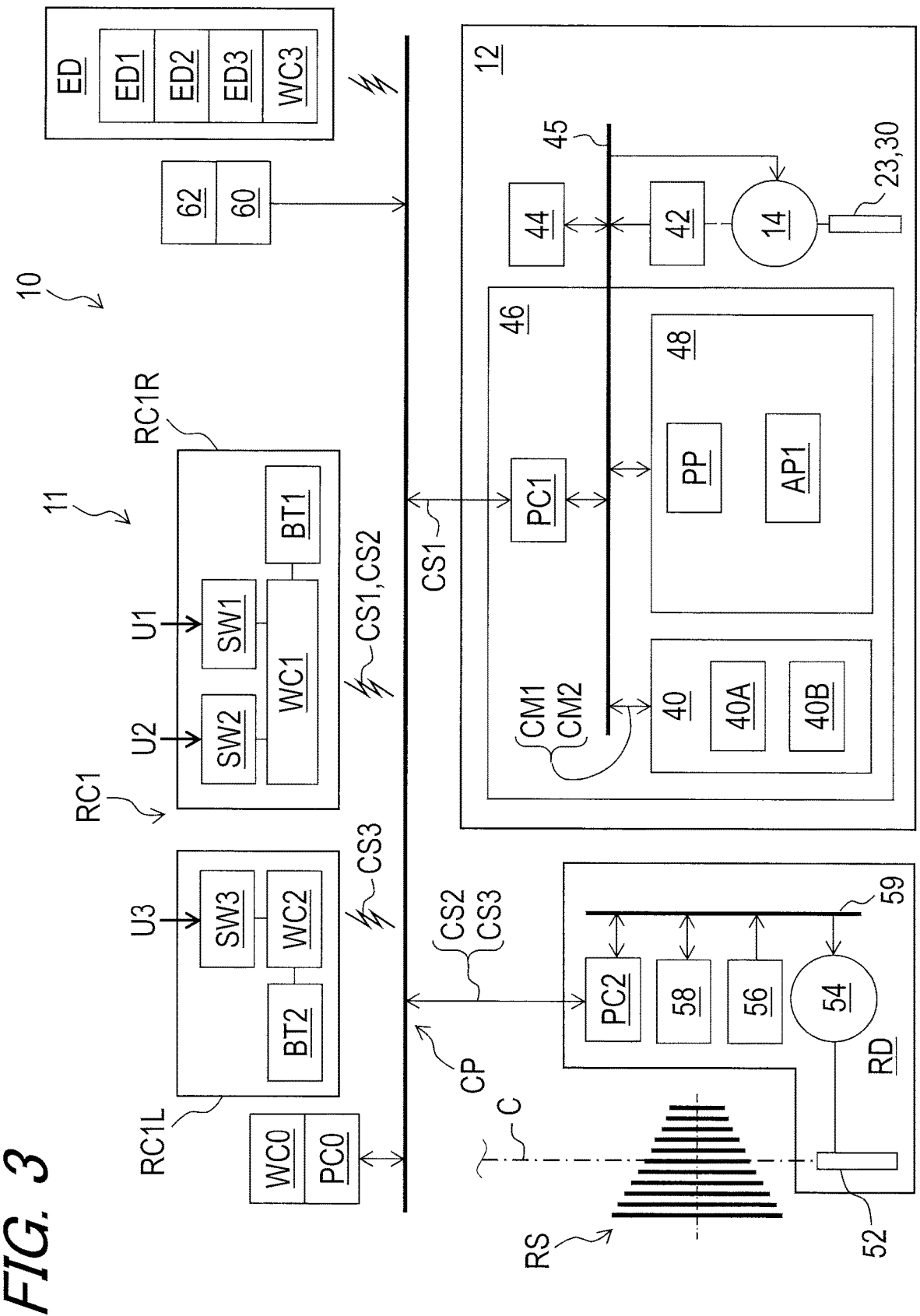
FIG. 3 is a block diagram of the bicycle control system illustrated in FIG. 1.

As seen in FIG. 3, the bicycle seatpost assembly 12 comprises a seatpost controller 40. The seatpost controller 40 is configured to control the electric actuator 14 to maintain the adjustable state during an adjustment period AP1 selectable from a plurality of predetermined adjustment periods PP. The seatpost controller 40 is electrically connected to the electric actuator 14 to control the electric actuator 14 in response to the seatpost user input U1 received with the remote controller RC1. In this embodiment, the seatpost controller 40 is electrically connected to the electric actuator 14 to control the electric actuator 14 in response to the seatpost control signal CS1 transmitted from the remote controller RC1 via wireless or wired communication. The seatpost controller 40 is configured to control the electric actuator 14 to maintain the adjustable state during the adjustment period AP1 in response to the seatpost control signal CS1. The seatpost controller 40 is configured to control the electric actuator 14 to maintain the open state during the adjustment period AP1.

The bicycle seatpost assembly 12 includes a position sensor 42 and an actuator driver 44. The electric actuator 14, the seatpost controller 40, the position sensor 42, and the actuator driver 44 are connected to each other with a bus 45.

The position sensor 42 is configured to sense a position of the flow control part 30 via the electric actuator 14. In this embodiment, the position sensor 42 is a contact rotational position sensor such as a potentiometer. The position sensor 42 is configured to sense an absolute rotational position of the rotational shaft of the electric actuator 14 as the position of the hydraulic valve 23. Other examples of the position sensor 42 include a non-contact rotational position sensor such as an optical sensor (e.g., a rotary encoder) and a magnetic sensor (e.g., a hall sensor).

The position sensor 42 is electrically connected to the actuator driver 44. The actuator driver 44 is configured to control the electric actuator 14 based on the position sensed by the position sensor 42 and a command generated by the seatpost controller 40. Specifically, the actuator driver 44 is electrically connected to the electric actuator 14 and the seatpost controller 40. The seatpost controller 40 is configured to generate an adjustment command CM1 in response to the seatpost control signal CS1. The seatpost controller 40 is configured to generate a lock command CM2 after the adjustment period AP1 elapses from the generation of the adjustment command CM1. The actuator driver 44 is configured to control the electric actuator 14 to move the hydraulic valve 23 from the closed position P11 (FIG. 2) to the open position P12 (FIG. 2) in response to the adjustment command CM1. The actuator driver 44 is configured to control the electric actuator 14 to move the hydraulic valve 23 from the open position P12 (FIG. 2) to the closed position P11 (FIG. 2) in response to the lock command CM2. The actuator driver 44 is configured to control the electric actuator 14 to stop the hydraulic valve 23 at the open position P12 (FIG. 2) based on the position sensed by the position sensor 42 when moving the hydraulic valve 23 from the closed position P11 (FIG. 2) to the open position P12 (FIG. 2). The actuator driver 44 is configured to control the electric actuator 14 to stop the hydraulic valve 23 at the closed position P11 (FIG. 2) based on the position sensed by the position sensor 42 when moving the hydraulic valve 23 from the open position P12 (FIG. 2) to the closed position P11 (FIG. 2).

As seen in FIG. 3, the seatpost controller 40 includes a central processing unit (CPU) 40A and a memory controller 40B. The bicycle seatpost assembly 12 includes a circuit board 46. The CPU 40A and the memory controller 40B are mounted on the circuit board 46 and are electrically connected to an internal conductor of the circuit board 46. The circuit board 46 is electrically connected to the bus 45. The CPU 40A and the memory controller 40B are electrically connected to the electric actuator 14, the position sensor 42, and the actuator driver 44 with the bus 45 and the circuit board 46.

The bicycle seatpost assembly 12 further comprises a seatpost memory 48. The seatpost memory 48 is mounted on the circuit board 46 and is electrically connected to the internal conductor of the circuit board 46. The seatpost controller 40 is electrically connected to the seatpost memory 48 with the circuit board 46 and the bus 45. The seatpost controller 40 is configured to communicate with the seatpost memory 48 via the circuit board 46 and the bus 45.

The seatpost memory 48 includes a read-only memory (ROM) and a random-access memory (RAM). For example, the ROM includes a non-transitory computer-readable storage medium, and the RAM includes a transitory computer-readable storage medium. However, the structure of the seatpost memory 48 is not limited to this embodiment. The seatpost memory 48 includes storage areas each having an address in the ROM and the RAM. The seatpost controller 40 controls the seatpost memory 48 to store data in the storage areas of the seatpost memory 48 and reads data from the storage areas of the seatpost memory 48.

At least one program is stored in the seatpost memory 48 (e.g., the ROM). The at least one program is read into the seatpost controller 40, and thereby the configuration and/or algorithm of the seatpost controller 40 is performed.

As seen in FIG. 3, the rear derailleur RD is configured to move a bicycle chain C relative to a rear sprocket RS in response to one of the upshift control signal CS2 and the downshift control signal CS3. The rear derailleur RD includes a base 50 (FIG. 1), a chain guide 52, a motor 54, a shift position sensor 56, and a motor driver 58. The motor 54, the shift position sensor 56, and the motor driver 58 are connected to each other with a bus 59. The motor 54 is mechanically coupled to the chain guide 52. The motor 54 is configured to move the chain guide 52 to shift a bicycle chain C relative to a rear sprocket RS. In this embodiment, the motor 54 includes a DC motor. The motor 54 includes a rotational shaft (not shown) to output a rotational force. The rotational shaft is coupled to the chain guide 52 via a gear reducer (not shown). Other examples of the motor 54 include a stepper motor and an AC motor.

The rear derailleur RD has a plurality of available shift positions as the shift position of the rear derailleur RD. In this embodiment, the rear derailleur RD has eleven available shift positions respectively corresponding to eleven sprocket wheels of the rear sprocket RS.

The shift position sensor 56 is configured to sense a position of the motor 54 as the shift position of the rear derailleur RD. In this embodiment, the shift position sensor 56 is a contact rotational position sensor such as a potentiometer. The shift position sensor 56 is configured to sense an absolute rotational position of the rotational shaft of the motor 54 as the shift position of the rear derailleur RD. Other examples of the shift position sensor 56 include a non-contact rotational position sensor such as an optical sensor (e.g., a rotary encoder) and a magnetic sensor (e.g., a hall sensor).

The shift position sensor 56 is electrically connected to the motor driver 58. The motor driver 58 is configured to control the motor 54 based on the rear shift position sensed by the shift position sensor 56. Specifically, the motor driver 58 is electrically connected to the motor 54. The motor driver 58 is configured to control a rotational direction and a rotational speed of the rotational shaft based on the shift position and each of the upshift and downshift control signals CS2 and CS3. Furthermore, the motor driver 58 is configured to stop rotation of the rotational shaft to position the chain guide 52 at one of the low to top gear positions based on the shift position and each of the upshift and downshift control signals CS2 and CS3.

As seen in FIGS. 1 and 3, the bicycle control system 10 includes a battery holder 60 and a battery 62. The battery holder 60 is mounted to the bicycle frame BF (FIG. 1) and is configured to detachably receive the battery 62. The battery 62 is electrically connected to the battery holder 60 in a state where the battery 62 is mounted to the battery holder 60. Examples of the battery 62 include a primary battery (e.g., a dry-cell battery) and a secondary battery (e.g., a rechargeable battery such as a rechargeable lithium-ion battery).

Power line communication (PLC) carries data on a conductor that is also used simultaneously for electric power transmission or electric power distribution to electric components. In this embodiment, the electric power is supplied from the battery 62 to the bicycle seatpost assembly 12, and the rear derailleur RD via the battery holder 60 and the electric communication path CP. Furthermore, the bicycle seatpost assembly 12 and the rear derailleur RD send and receive control signals via the electric communication path CP using the PLC.

As seen in FIG. 1, the electric communication path CP includes a junction J1, and first to third cables C1 to C3. Each of the first to third cables C1 to C3 includes electric connectors at both ends thereof. The junction J1 is electrically connected to the battery holder 60 with the first cable C1. The junction T1 is electrically connected to the bicycle seatpost assembly 12 with the second cable C2. The junction T1 is electrically connected to the rear derailleur RD with the third cable C3.

Each of the first to third cables C1 to C3 includes a ground line and a voltage line that are detachably connected to a serial bus that is formed by communication interfaces and the junction J1. Electric power is supplied from the battery 62 to the bicycle seatpost assembly 12 and the rear derailleur RD via the voltage line. In this embodiment, the bicycle seatpost assembly 12 and the rear derailleur RD can all communicate with each other through the voltage line using the power line communication technology.

The PLC uses unique identifying information such as a unique identifier that is assigned to each of the bicycle seatpost assembly 12 and the rear derailleur RD. Each of the bicycle seatpost assembly 12 and the rear derailleur RD includes a PLC controller in which the unique identifying information is stored. Based on the unique identifying information, each of the bicycle seatpost assembly 12 and the rear derailleur RD can recognize control signals which are necessary for itself among control signals transmitted via the electric communication path CP.

The bicycle seatpost system 11 includes a wireless communicator WC0 configured to wirelessly communicate with the remote controller RC1. In this embodiment, the wireless communicator WC0 is provided in the junction J1 and is connected to the bicycle seatpost assembly 12 and the rear derailleur RD with the electric communication path CP. The wireless communicator WC0 can be provided at other locations such as the bicycle seatpost assembly 12, the rear derailleur RD, and the battery holder 60.

As seen in FIG. 3, the first operating device RC1R includes a first wireless communicator WC1 and a first battery BT1. The first wireless communicator WC1 is configured to wirelessly communicate with the wireless communicator WC0. The first battery BT1 is connected to the first wireless communicator WC1 to supply electric power to the first wireless communicator WC1.

The second operating device RC1R includes a second wireless communicator WC2 and a second battery BT2. The second wireless communicator WC2 is configured to wirelessly communicate with the wireless communicator WC0. The second battery BT2 is connected to the second wireless communicator WC2 to supply electric power to the second wireless communicator WC2.

The first wireless communicator WC1 is connected to the seatpost operating switch SW1 to wirelessly transmit the seatpost control signal CS1 to the bicycle seatpost assembly 12 via the wireless communicator WC0 and the electric communication path CP. The first wireless communicator WC1 is connected to the upshift operating switch SW2 to wirelessly transmit the upshift control signal CS2 to the bicycle seatpost assembly 12 via the wireless communicator WC0 and the electric communication path CP. The second wireless communicator WC2 is connected to the downshift operating switch SW3 to wirelessly transmit the downshift control signal CS3 to the bicycle seatpost assembly 12 via the wireless communicator WC0 and the electric communication path CP.

The first wireless communicator WC1 includes a signal transmitting circuit, a signal receiving circuit, and an antenna. Thus, the first wireless communicator WC1 can also be referred to as a first wireless communication circuit or circuitry WC1. The first wireless communicator WC1 is configured to superimpose digital signals such as the seatpost control signal CS1 and the upshift control signal CS2 on carrier wave using a predetermined wireless communication protocol to wirelessly transmit the seatpost control signal CS1 and the upshift control signal CS2.

Furthermore, the first wireless communicator WC1 is configured to receive a wireless signal from other bicycle components such as the wireless communicator WC0. In this embodiment, the first wireless communicator WC1 is configured to receive a pairing completion signal from the wireless communicator WC0. The first wireless communicator WC1 is configured to decode the wireless signal to recognize information wirelessly transmitted from the wireless communicator WC0. The first wireless communicator WC1 may decrypt the encrypted wireless signal using the cryptographic key.

In this embodiment, the first wireless communicator WC1 is provided as a wireless transmitter and a wireless receiver. The first wireless communicator WC1 is integrally provided as a single module or unit. However, the first wireless communicator WC1 can be constituted of a wireless transmitter and a wireless receiver which are provided as separate modules or units arranged at different positions from each other. The function of the wireless receiver can be omitted from the first wireless communicator WC1.

The second wireless communicator WC2 includes a signal transmitting circuit, a signal receiving circuit, and an antenna. Thus, the second wireless communicator WC2 can also be referred to as a second wireless communication circuit or circuitry WC2. The second wireless communicator WC2 is configured to superimpose digital signals such as the downshift control signal CS3 on carrier wave using a predetermined wireless communication protocol to wirelessly transmit the downshift control signal CS3. The second wireless communicator WC2 has substantially the same structure and/or configuration as that of the first wireless communicator WC1. Thus, it will not be described in detail here for the sake of brevity.

The wireless communicator WC0 includes a signal transmitting circuit, a signal receiving circuit, and an antenna. Thus, the wireless communicator WC0 can also be referred to as a wireless communication circuit or circuitry WC0. The wireless communicator WC0 is configured to wirelessly receive the seatpost control signal CS1, the upshift control signal CS2, and the downshift control signal CS3 transmitted from the remote controller RC1. The wireless communicator WC0 has substantially the same structure and/or configuration as that of the first wireless communicator WC1. Thus, it will not be described in detail here for the sake of brevity.

The bicycle seatpost system 11 includes a PLC controller PC0 connected to the wireless communicator WC0. The PLC controller PC0 is connected to the electric communication path CP. The PLC controller PC is configured to separate input signals to a power source voltage and control signals. The PLC controller PC is configured to regulate the power source voltage to a level at which the wireless communicator WC0 can properly operate. The PLC controller PC is further configured to superimpose output signals such as the seatpost control signal CS1, the upshift control signal CS2, and the downshift control signal CS3 on the power source voltage applied to the electric communication path CP from the battery 62.

As seen in FIG. 3, the bicycle seatpost assembly 12 includes a first PLC controller PC1. The first PLC controller PC1 is connected to the wireless communicator WC0 with the electric communication path CP and the PLC controller PC0. The first PLC controller PC1 is connected to the seatpost controller 40 and the memory 48 with the bus 45. The rear derailleur RD includes a second PLC controller PC2. The second PLC controller PC2 is connected to the motor 54, the shift position sensor 56, and the motor driver 58 with the bus 59.

The first PLC controller PC1 is configured to separate input signals to a power source voltage and control signals such as the seatpost control signal CS1, the upshift control signal CS2, and the downshift control signal CS3. The first PLC controller PC1 is configured to regulate the power source voltage to a level at which the bicycle seatpost assembly 12 can properly operate. The first PLC controller PC1 is further configured to superimpose output signals on the power source voltage applied to the electric communication path CP from the battery 62.

The second PLC controller PC2 has substantially the same structure and/or configuration as that of the first PLC controller PC1. Specifically, the second PLC controller PC2 is configured to separate input signals to the power source voltage and control signals such as the seatpost control signal CS1, the upshift control signal CS2, and the downshift control signal CS3. The second PLC controller PC2 is configured to regulate the power source voltage to a level at which the rear derailleur RD can properly operate. The second PLC controller PC2 is further configured to superimpose the downshift control signal CS3 on the power source voltage applied to the electric communication path CP from the battery 62.

As seen in FIG. 3, the seatpost memory 48 is configured to store the adjustment period AP1. The seatpost memory 48 is configured to store the plurality of predetermined adjustment periods PP. The seatpost memory 48 is configured to communicate with an external device ED. The seatpost memory 48 is configured to store the adjustment period AP1 selected from the plurality of predetermined adjustment periods PP by using the external device ED. The external device ED is a separate device from the remote controller RC1.

In this embodiment, the seatpost memory 48 is configured to communicate with the external device ED during setting of the bicycle control system 10. The seatpost memory 48 is configured to store the adjustment period AP1 by using the external device ED during setting of the bicycle control system 10. The memory controller 40B of the seatpost controller 40 is configured to assist communication between the seatpost memory 48 and the external device ED during the setting of the bicycle control system 10. However, the seatpost memory 48 can be configured to communicate with the external device ED without the seatpost controller 40.

Examples of the external device ED include a personal computer, a smart phone, and a tablet computer. The external device ED is configured to be wirelessly connected to the seatpost controller 40 during setting of the bicycle control system 10. However, the external device ED can be connected to the seatpost controller 40 with an electric cable.

The external device ED includes a processor ED1, an input device ED2, a display ED3, and a wireless communicator WC3. The processor ED1 includes a CPU, a memory controller, and a memory as well as the seatpost controller 40. At least one program is stored in the memory of the processor ED1 The at least one program is read into the CPU of the processor ED1, and thereby the configuration and/or algorithm of the external device ED is performed. The input device ED2 is configured to receive a user input. The display ED3 is configured to display settings of the bicycle control system 10. For example, the display ED3 is configured to display the plurality of predetermined adjustment period PP to allow the user to select one of the plurality of predetermined adjustment period PP as the adjustment period AP1.

As seen in FIGS. 1 and 3, in this embodiment, the external device ED is configured to be wirelessly connected to the wireless communicator WC0 with the wireless communicator WC3. The wireless communicator WC3 has substantially the same structure and/or configuration as that of the wireless communicator WC0. Thus, it will not be described in detail here for the sake of brevity.

As seen in FIG. 3, the seatpost controller 40 is configured to control the electric actuator 14 based on the adjustment period AP1 selected from the plurality of predetermined adjustment periods PP by using the external device ED. The seatpost controller 40 has a normal mode and a setting mode. In the normal mode, the seatpost controller 40 is configured to control the electric actuator 14 based on the adjustment period AP1 stored in the seatpost memory 48. In the setting mode, the seatpost controller 40 is configured to communicate with the external device ED so that the user selects the adjustment period AP1 from the plurality of predetermined adjustment periods PP. The wireless communicators WC0 and WC3 are configured to execute pairing to establish wireless communication between the remote controller RC1 and the external device ED. The seatpost controller 40 is configured to change the mode of the seatpost controller 40 from the normal mode to the setting mode in response to completion of the pairing between the remote controller RC5 and the external device ED.

Figure 4:
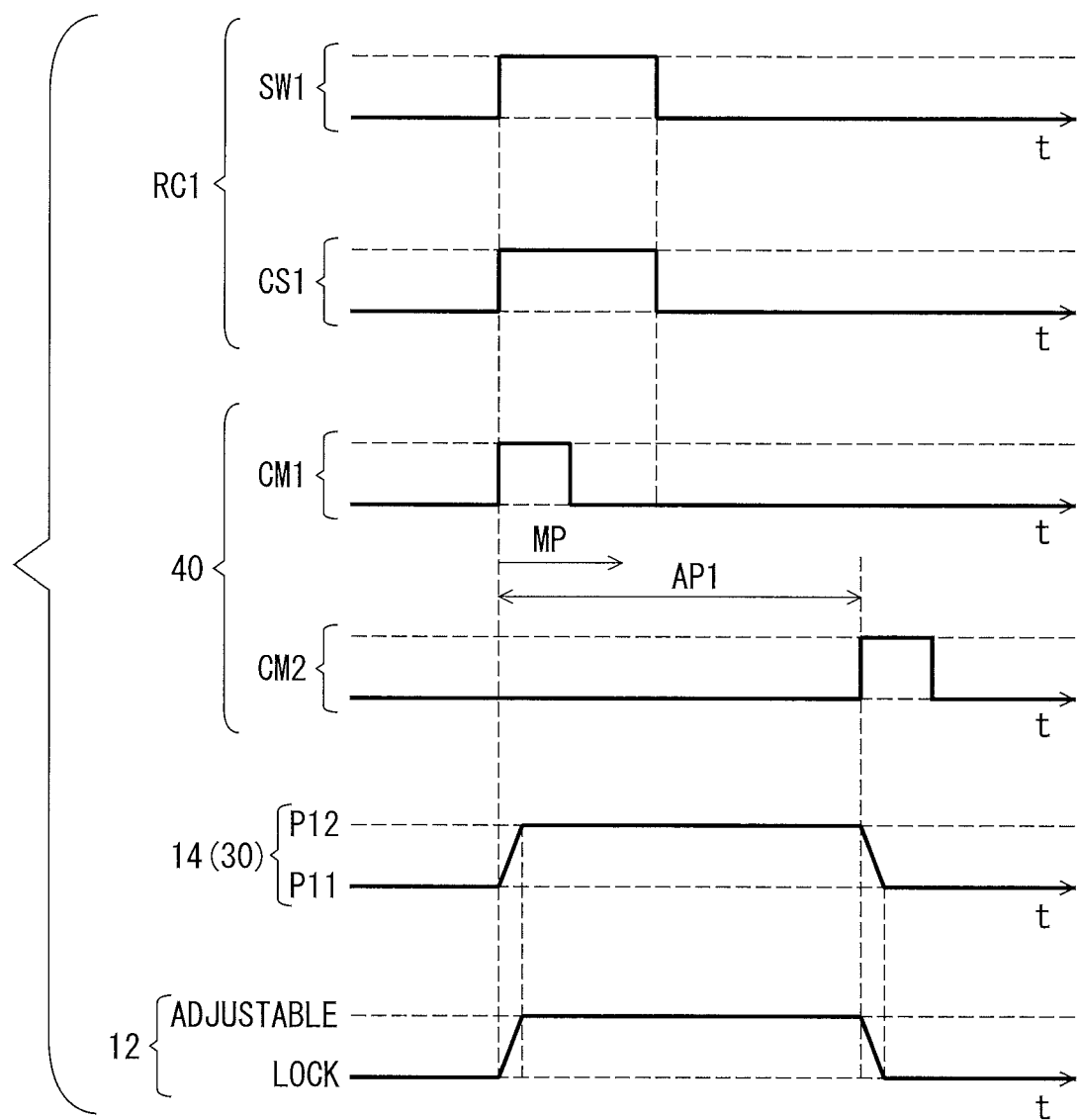
FIG. 4 is a timing chart of the bicycle control system illustrated in FIG. 1.
Figure 5:
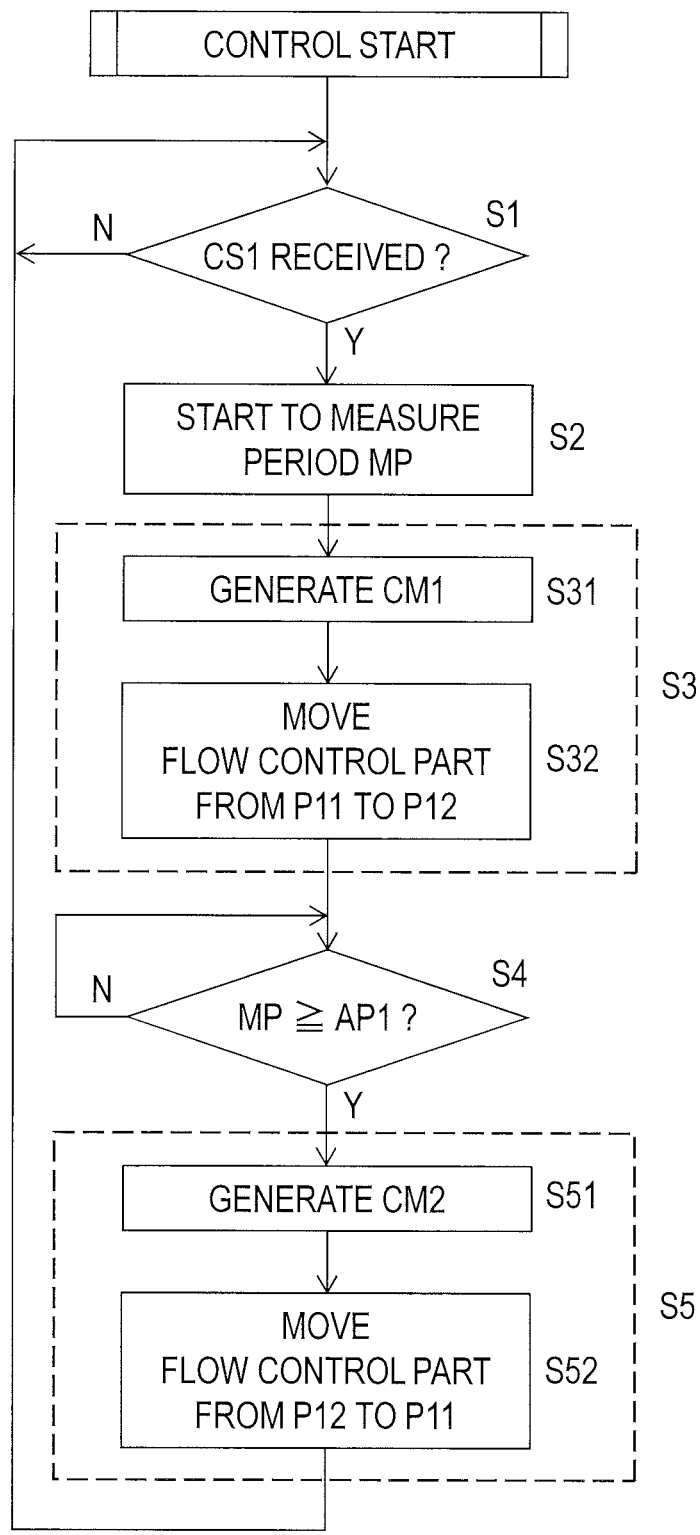
FIG. 5 is a flow chart of operation of the bicycle seatpost assembly illustrated in FIG. 1.

As seen in FIGS. 4 and 5, in the normal mode, the seatpost controller 40 controls the electric actuator 14 to maintain the lock state while the seatpost controller 40 does not receive the seatpost control signal CS1 (step S1). The seatpost controller 40 starts to measure a period MP when the seatpost controller 40 receives the seatpost control signal CS1 (steps S1 and S2).

The seatpost controller 40 controls the electric actuator 14 to change the state of the bicycle seatpost assembly 12 from the lock state to the adjustable state when the seatpost controller 40 receives the seatpost control signal CS1 (step S3). In this embodiment, the seatpost controller 40 generates the adjustment command CM1 when the seatpost controller 40 receives the seatpost control signal CS1 (step S31). The actuator driver 44 is configured to control the electric actuator 14 to move the hydraulic valve 23 from the closed position P11 to the open position P12 in response to the adjustment command CM1 (step S32).

The seatpost controller 40 controls the electric actuator 14 to maintain the adjustable state until the adjustment period AP1 elapses from the timing at which the seatpost controller 40 receives the seatpost control signal CS1 (steps S4 and S5). In the adjustable state, the rider can change the total length L1 of the bicycle seatpost assembly 12 by applying or releasing the rider's weight. In this embodiment, the seatpost controller 40 compares the measured period MP with the adjustment period AP1 (step S4). The seatpost controller 40 generates the lock command CM2 when the measured period MP is equal to or larger than the adjustment period AP1 (step S51). The actuator driver 44 controls the electric actuator 14 to move the hydraulic valve 23 from the open position P12 to the closed position P11 in response to the lock command CM2 (step S52). Thus, the process returns to the step S1.

Second Embodiment

A bicycle seatpost system 211 including a bicycle seatpost assembly 212 in accordance with a second embodiment will be described below referring to FIGS. 6 to 11. The bicycle seatpost system 211 has the same structure and/or configuration as that of the bicycle seatpost system 11 except for the seatpost controller 40 and the remote controller RC1. Thus, elements having substantially the same function as those in the first embodiment will be numbered the same here, and will not be described and/or illustrated again in detail here for the sake of brevity.

Figure 6:
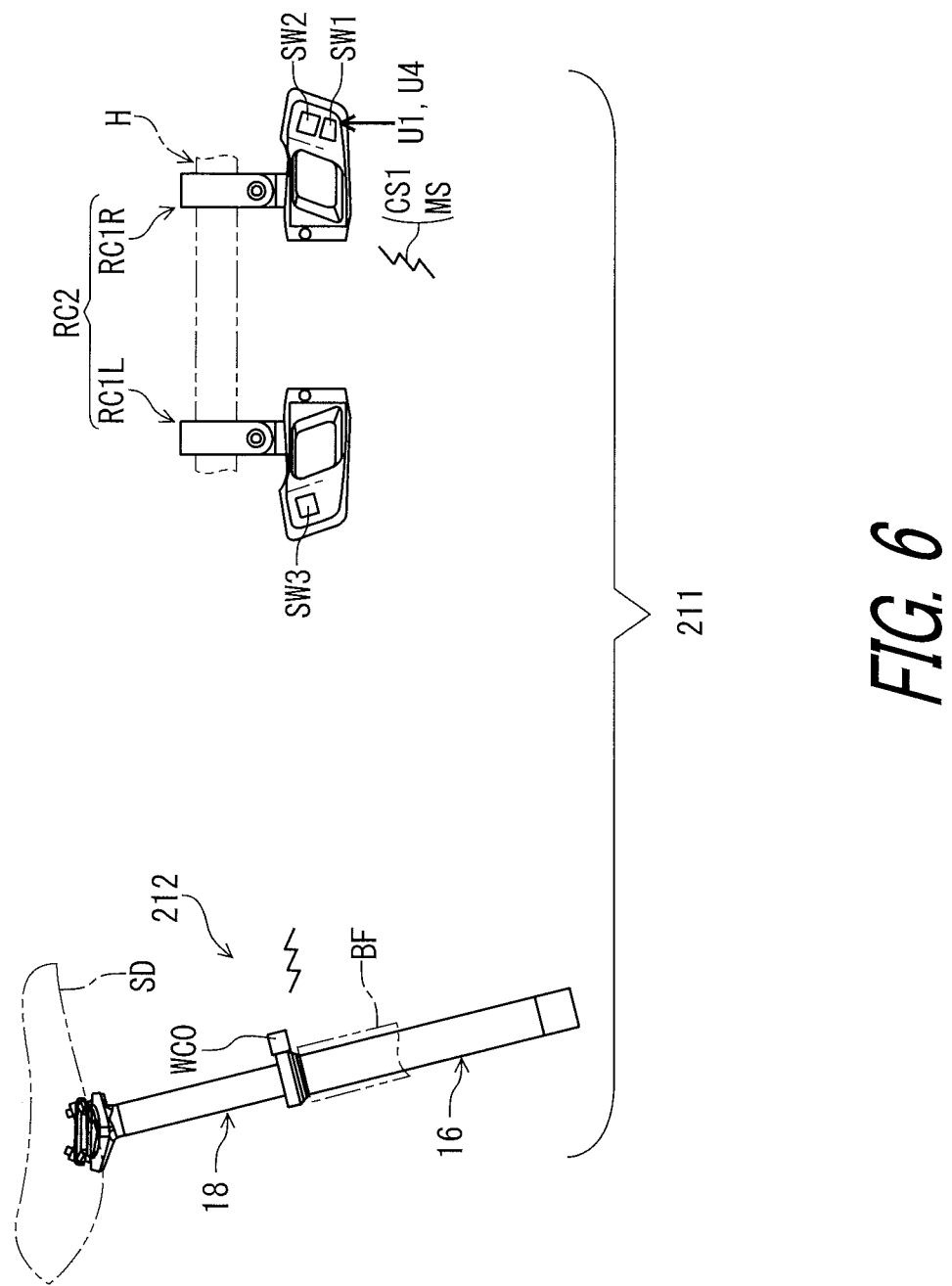
FIG. 6 is a schematic diagram of a bicycle control system including a bicycle seatpost assembly in accordance with a second embodiment.
Figure 7:
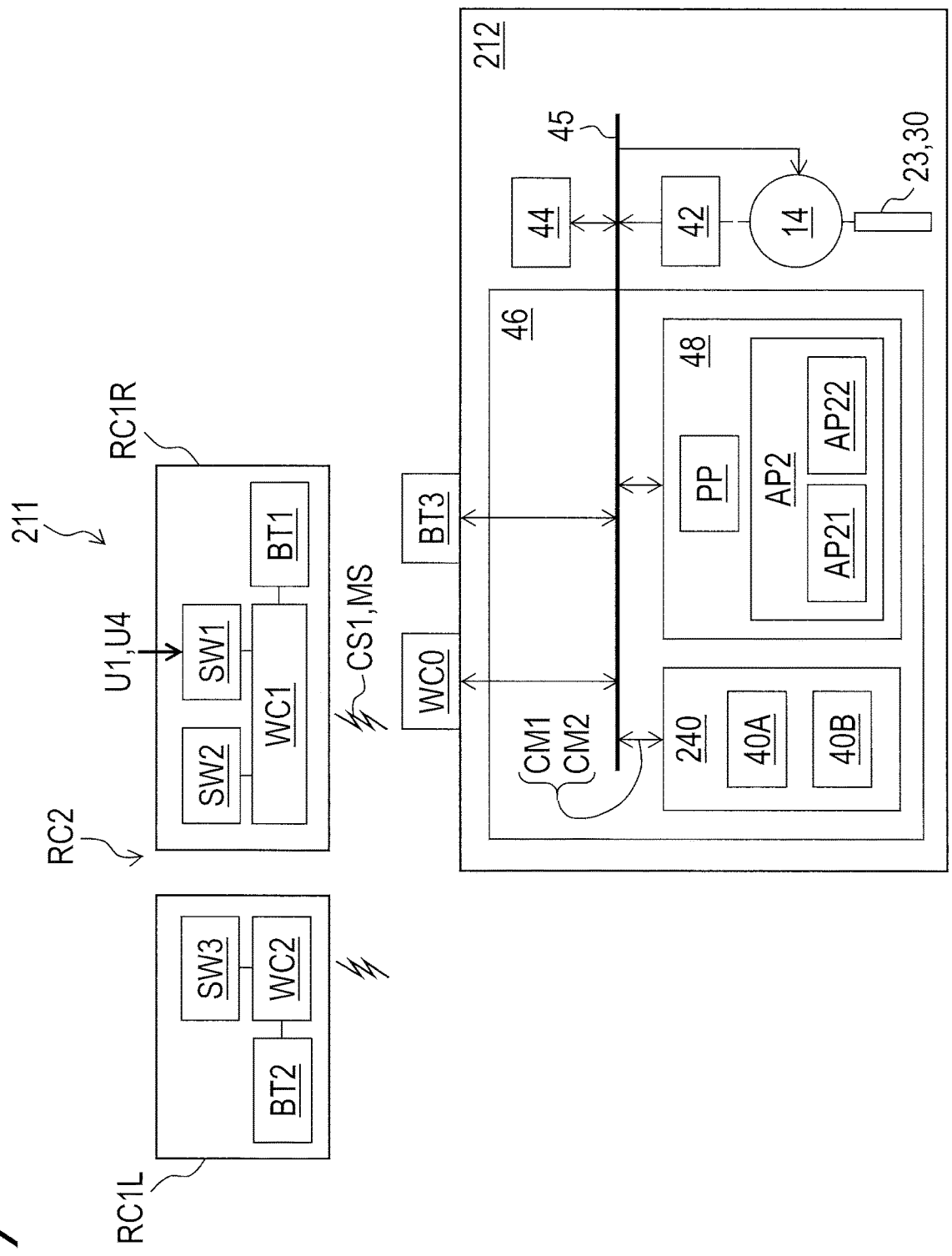
FIG. 7 is a block diagram of the bicycle control system illustrated in FIG. 6.

As seen in FIGS. 6 and 7, the bicycle seatpost system 211 includes the bicycle seatpost assembly 212 and a remote controller RC2. The bicycle seatpost assembly 212 comprises the electric actuator 14 and a seatpost controller 240. In the bicycle seatpost system 211, the rear derailleur RD and the battery 62 are omitted. In this embodiment, the external device ED is omitted. The wireless communicator WC0 is mounted to the bicycle seatpost assembly 12 and is connected to the seatpost controller 240 and the remote memory 48. The bicycle seatpost assembly 212 comprises a battery BT3. The battery BT3 is connected to the bus 45 to supply electric power to the wireless communicator WC0, the seatpost controller 240, the seatpost memory 48, and other components. In this embodiment, the adjustment period can be changed via the remote controller RC2.

The seatpost controller 240 has substantially the same structure and/or configuration as that of the seatpost controller 40 of the first embodiment. The seatpost controller 240 is configured to control the electric actuator 14 to maintain the adjustable state during an adjustment period AP2 selectable from the plurality of predetermined adjustment periods PP. Unlike the first embodiment, the plurality of predetermined adjustment periods PP includes a first adjustment period AP21 and a second adjustment period AP22. The second adjustment period AP22 is different from the first adjustment period AP21. In this embodiment, the second adjustment period AP22 is longer than the first adjustment period AP21. The seatpost memory 48 is configured to store the first adjustment period AP21 and the second adjustment period AP22.

The seatpost controller 240 has a first control mode to control the electric actuator 14 based on the first adjustment period AP21, and a second control mode to control the electric actuator 14 based on the second adjustment period AP22. The seatpost controller 240 controls the electric actuator 14 to maintain the adjustable state during the first adjustment period AP21 in the first mode in response to the user input from the remote controller RC2. The seatpost controller 240 controls the electric actuator 14 to maintain the adjustable state during the second adjustment period AP22 in the second mode in response to the user input from the remote controller RC2.

The seatpost controller 240 is configured to change a mode of the seatpost controller 240 between the first control mode and the second control mode. The seatpost controller 240 is configured to change the mode of the seatpost controller 240 between the first control mode and the second control mode based on an input from the remote controller RC2.

The remote controller RC2 has substantially the same structure as that of the remote controller RC1 of the first embodiment. In this embodiment, the seatpost operating switch SW1 is configured to generate a mode signal MS in response to a mode user input U4 received by the remote controller RC2. The mode user input U4 includes a long press of the seatpost operating switch SW1. Namely, the seatpost operating switch SW1 is configured to generate the mode signal MS rather than the seatpost control signal CS1 in response to the long press of the seatpost operating switch SW1. The seatpost operating switch SW1 is configured to separately recognize the seatpost user input U1 and the mode user input U4 and is configured to separately generate the seatpost control signal CS1 and the mode signal MS.

The seatpost controller 240 is configured to change the mode of the seatpost controller 240 from the second control mode to the first control mode in response to the mode signal MS. The seatpost controller 240 is configured to change the mode of the seatpost controller 240 from the first control mode to the second control mode in response to the mode signal MS.

In this embodiment, the seatpost operating switch SW1 is used to generate the seatpost control signal CS1 and the mode signal MS. However, the remote controller RC2 can include another switch to generate the mode signal MS.

Figure 8:
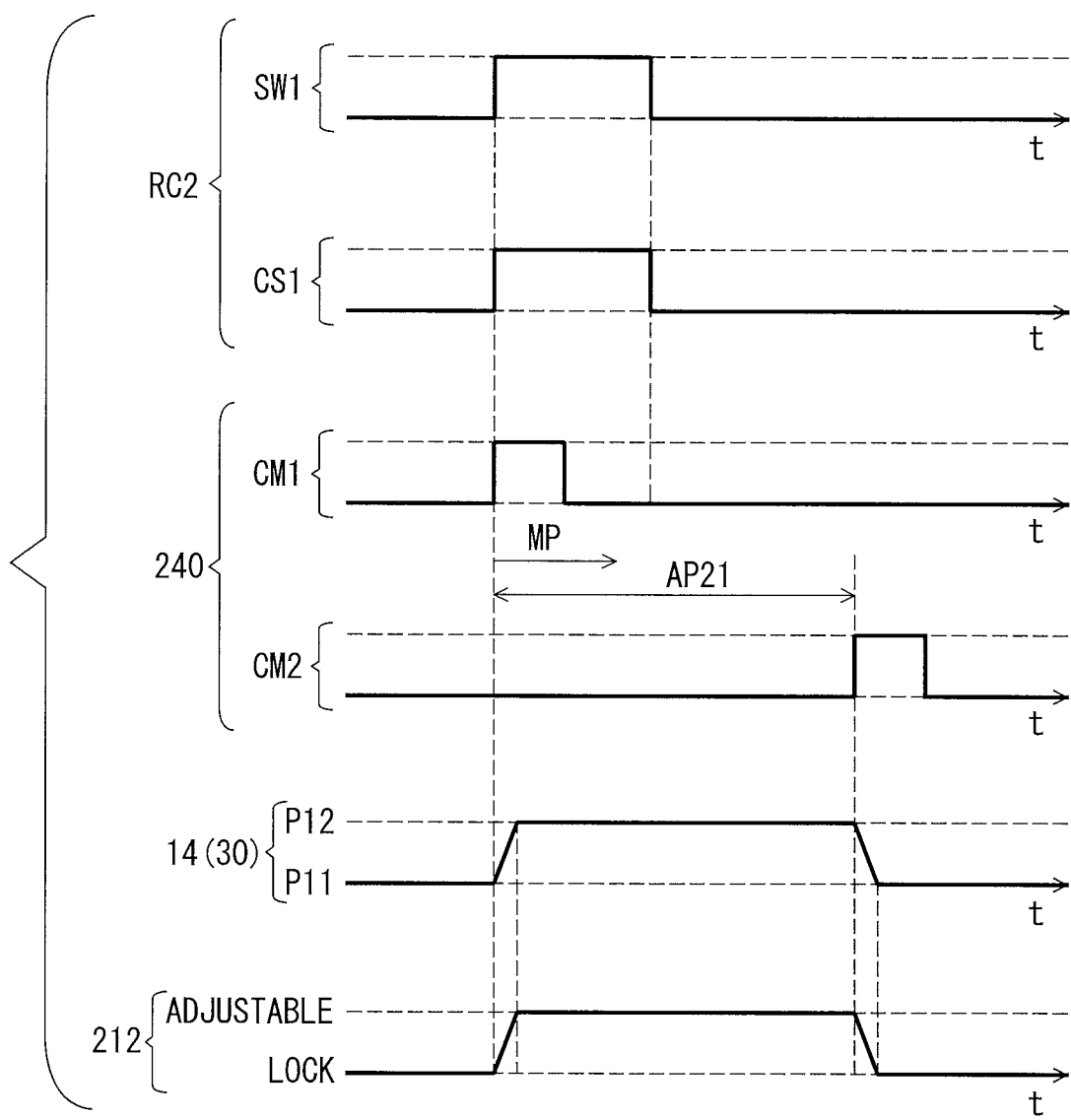
FIGS. 8 and 9 are timing charts of the bicycle control system illustrated in FIG. 6.
Figure 9:
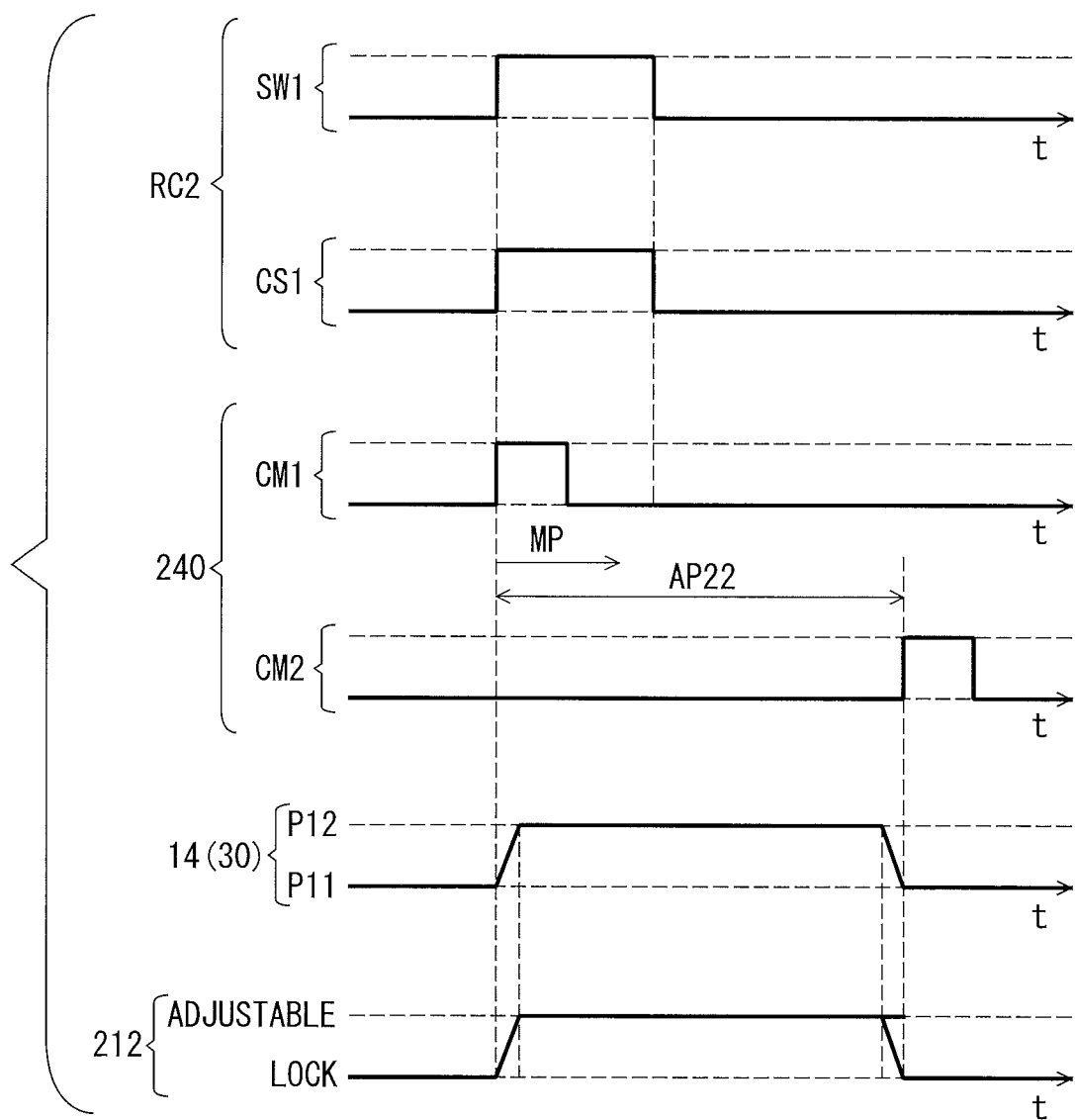
Figure 10:
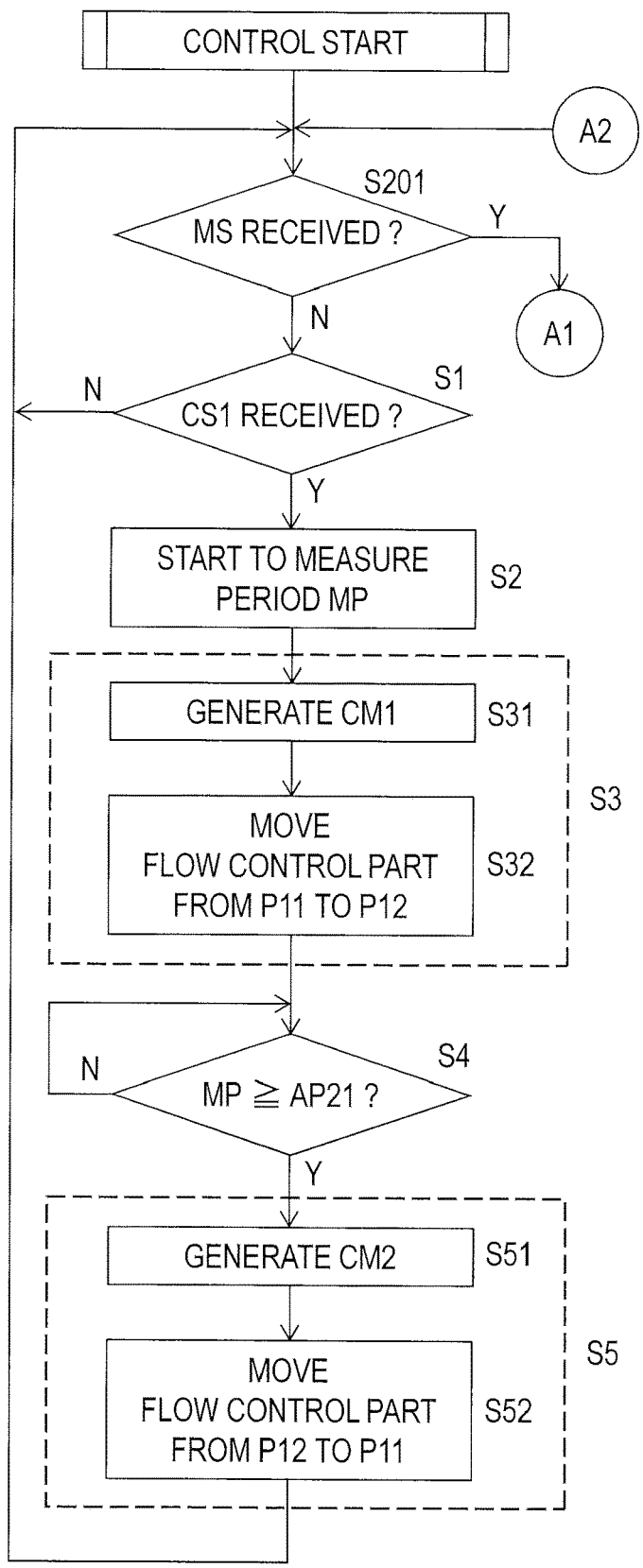
FIGS. 10 and 11 are flow charts of operation of the bicycle seatpost assembly illustrated in FIG. 6.
Figure 11:
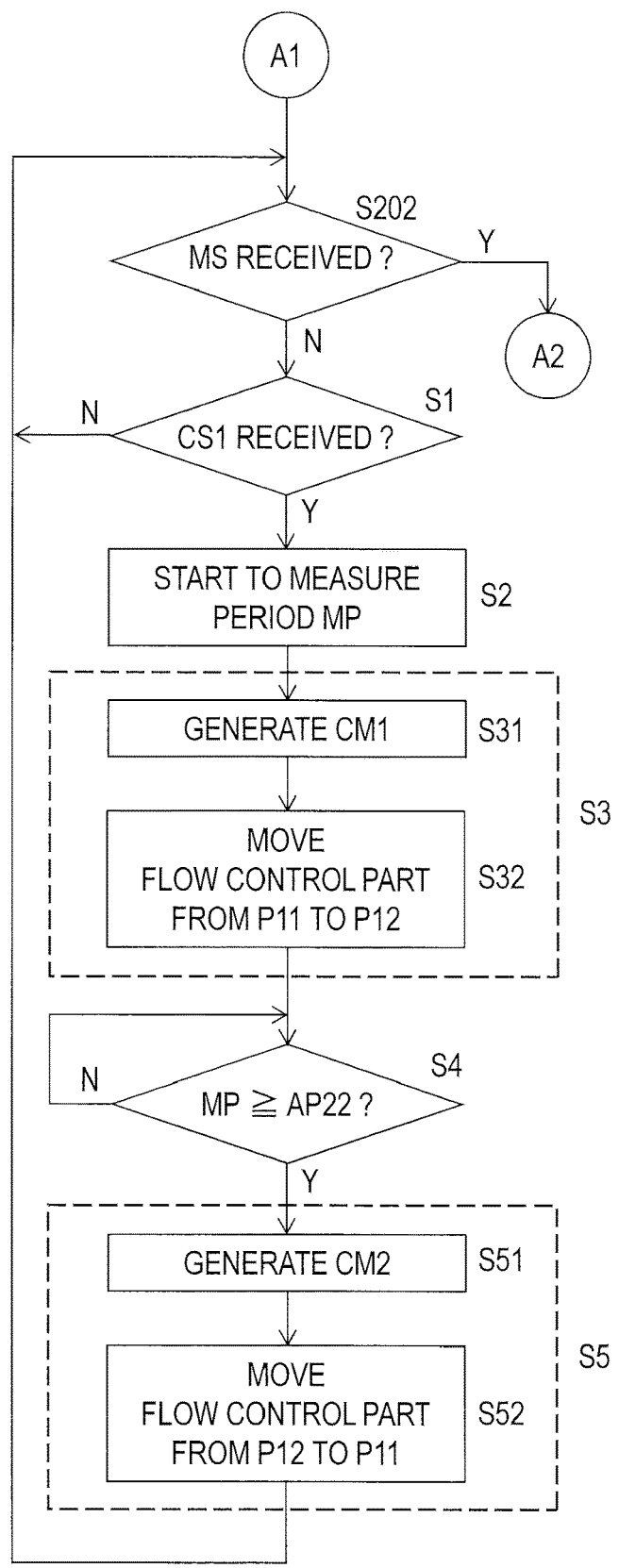

As seen in FIGS. 8 and 9, the seatpost controller 240 determines the receipt of the mode signal MS (steps S201 and S202). The seatpost controller 240 executes the steps S1 to S5 as well as the first embodiment. As seen in FIGS. 8 and 10, in the first control mode, the seatpost controller 240 compares the measured period MP with the first adjustment period AP21 (step S4 of FIG. 10). As seen in FIGS. 9 and 11, in the second control mode, the seatpost controller 240 compares the measured period MP with the second adjustment period AP22 (step S4 of FIG. 11).

Third Embodiment

A bicycle seatpost system 311 including a bicycle seatpost assembly 312 in accordance with a third embodiment will be described below referring to FIGS. 12 and 13. The bicycle seatpost system 311 has the same structure and/or configuration as that of the bicycle seatpost system 211 except for a mode switch. Thus, elements having substantially the same function as those in the above embodiments will be numbered the same here, and will not be described and/or illustrated again in detail here for the sake of brevity.

Figure 12:
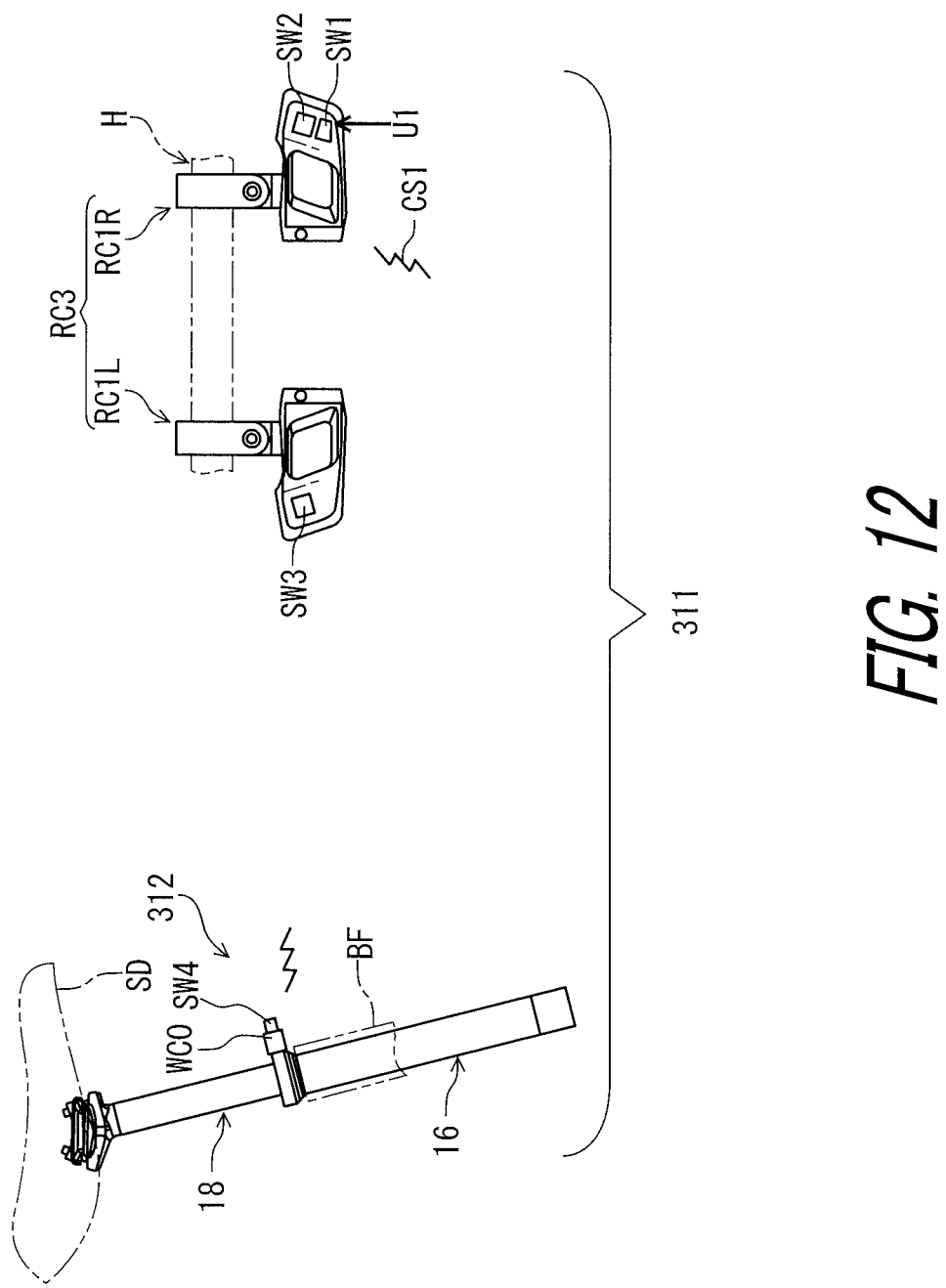
FIG. 12 is a schematic diagram of a bicycle control system including a bicycle seatpost assembly in accordance with a third embodiment.
Figure 13:
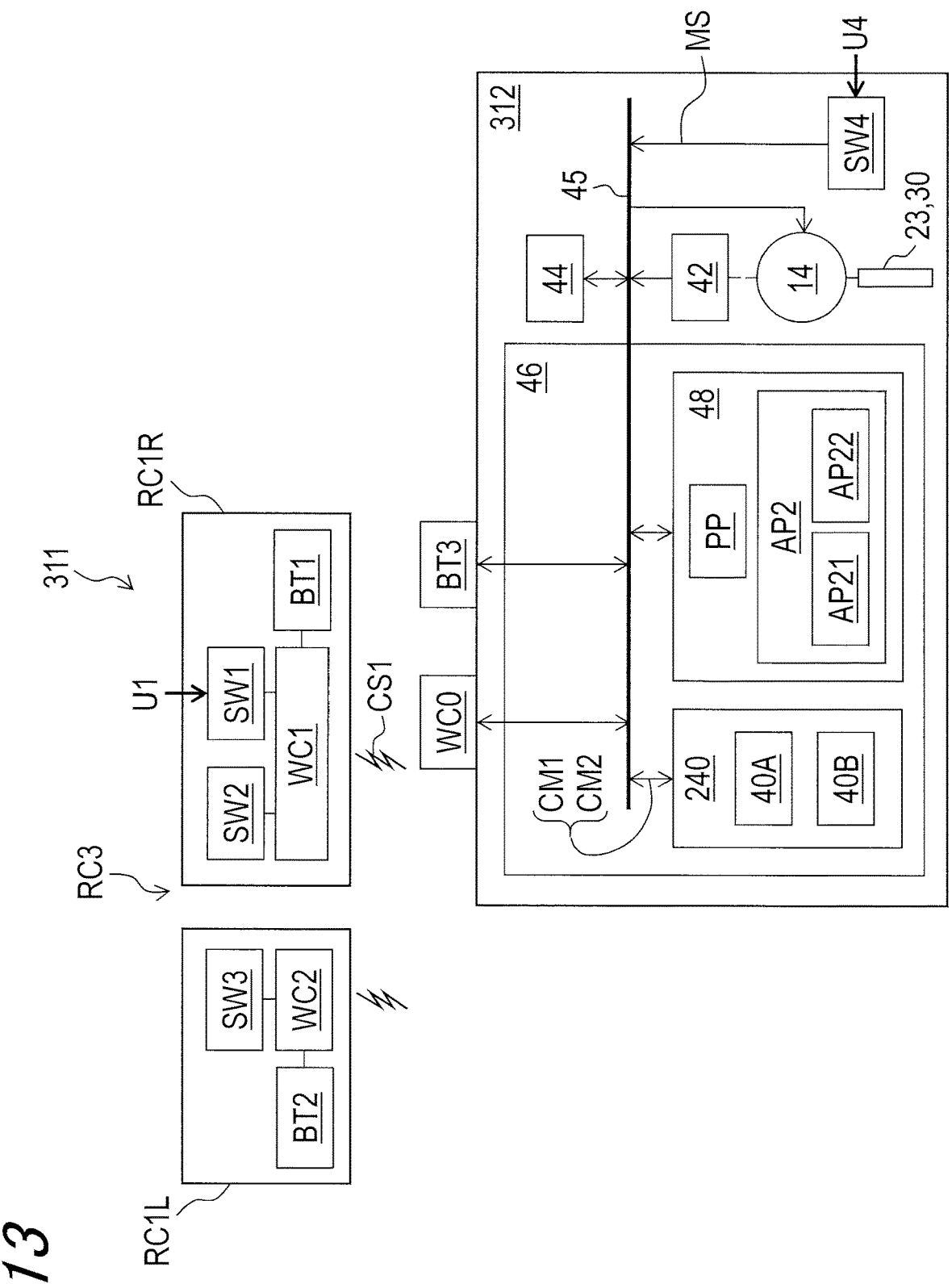
FIG. 13 is a block diagram of the bicycle control system illustrated in FIG. 12.

As seen in FIGS. 12 and 13, in this embodiment, the bicycle seatpost assembly 312 includes a mode switch SW4 to change the mode of the seatpost controller 40. As seen in FIG. 12, for example, the mode switch SW4 is attached to the first tube 16. However, the mode switch SW4 can be attached to the second tube 18. The mode switch SW4 is configured to generate the mode signal MS in response to the mode user input U4. In this embodiment, the mode user input U4 can include a normal press and/or a long press. The mode switch SW4 is configured to generate the mode signal MS in response to the mode user input U4.

Other structures of the bicycle seatpost assembly 312 are substantially the same as the structures of the bicycle seatpost assembly 212 of the second embodiment. Thus, they will not be described in detail here for the sake of brevity.

Fourth Embodiment

A bicycle seatpost system 411 including a bicycle seatpost assembly 412 in accordance with a third embodiment will be described below referring to FIGS. 14 to 17. The bicycle seatpost system 411 has the same structure and/or configuration as that of the bicycle seatpost system 211 except for the seatpost controller 240 and the remote controller RC2. Thus, elements having substantially the same function as those in the above embodiments will be numbered the same here, and will not be described and/or illustrated again in detail here for the sake of brevity.

Figure 14:
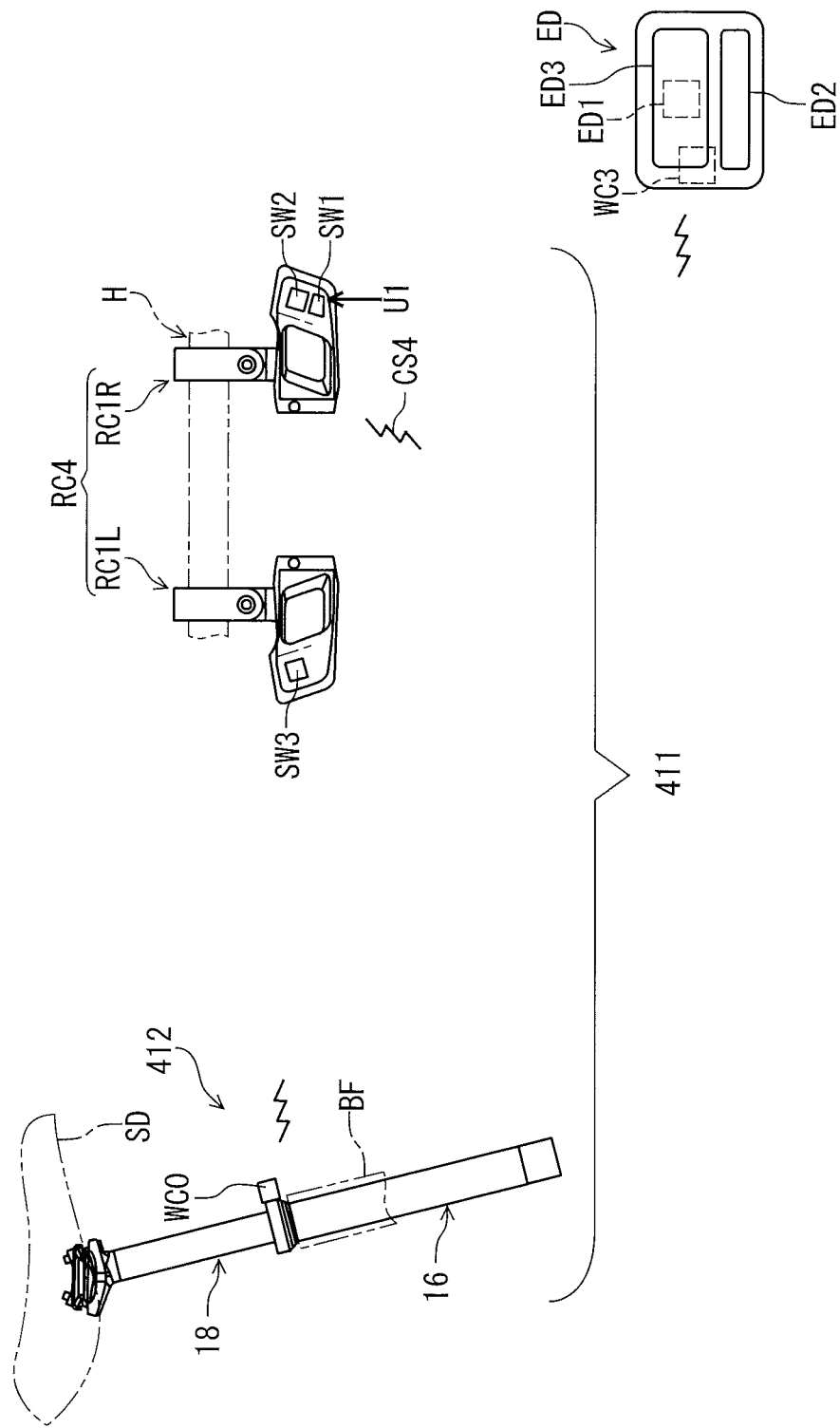
FIG. 14 is a schematic diagram of a bicycle control system including a bicycle seatpost assembly in accordance with a fourth embodiment.
Figure 15:
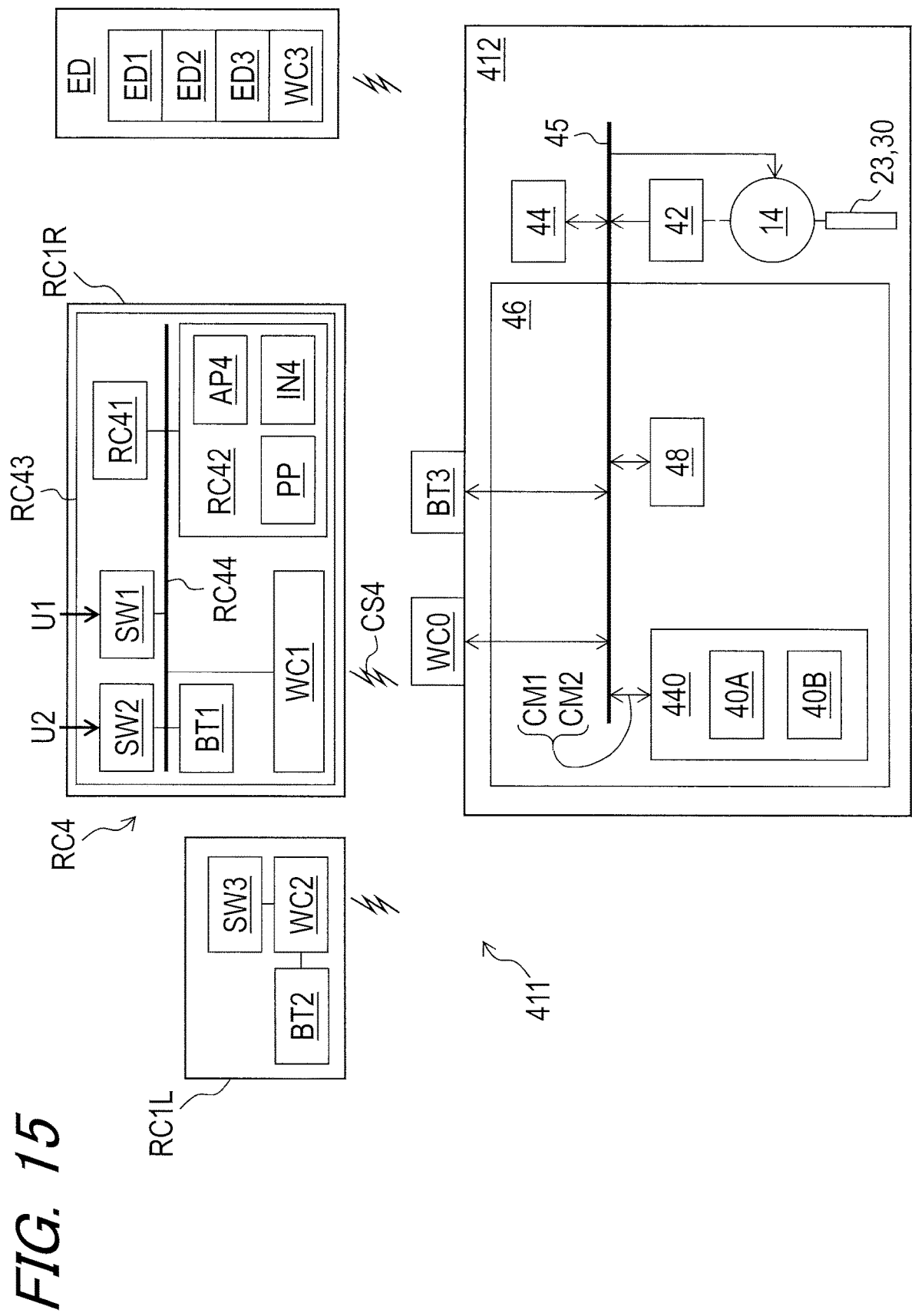
FIG. 15 is a block diagram of the bicycle control system illustrated in FIG. 14.

As seen in FIGS. 14 and 15, the bicycle seatpost system 411 includes the bicycle seatpost assembly 412 and a remote controller RC4. The bicycle seatpost assembly 412 comprises the electric actuator 14 and a seatpost controller 440. The seatpost controller 440 has substantially the same structure and/or configuration as that of the seatpost controller 40 of the first embodiment. The seatpost controller 440 is configured to control the electric actuator 14 to maintain the adjustable state during an adjustment period AP4 selectable from the plurality of predetermined adjustment periods PP.

Figure 16:
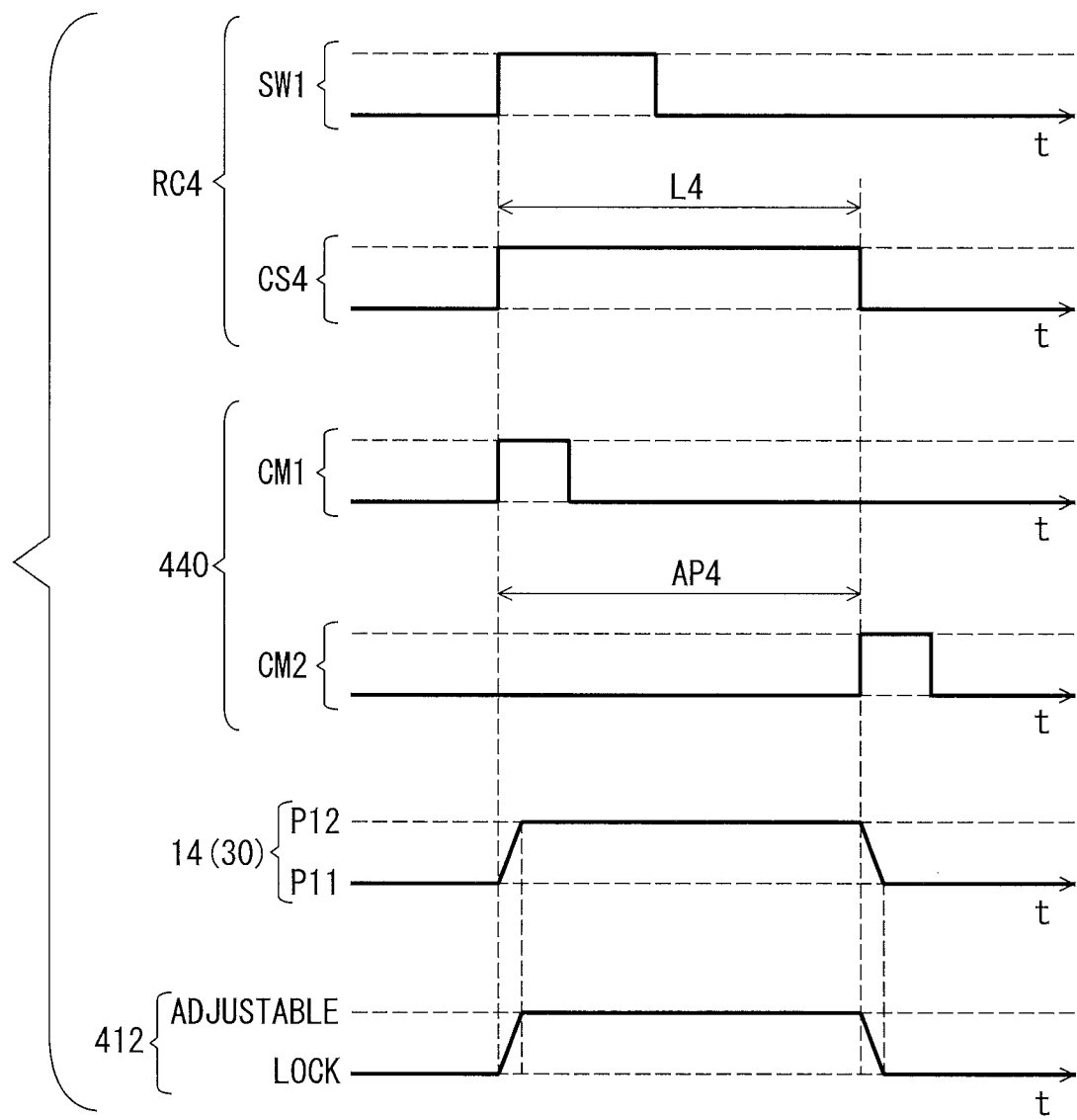
FIG. 16 is a timing chart of the bicycle control system illustrated in FIG. 14.

In this embodiment, the seatpost controller 440 is configured to control the electric actuator 14 to maintain the adjustable state during the adjustment period AP4 based on a control signal CS4 from the remote controller RC4. The control signal CS4 includes adjustment information IN4 relating to the adjustment period AP4. As seen in FIG. 16, the adjustment information IN4 includes a signal length L4 of the control signal CS4. The seatpost controller 440 is configured to control the electric actuator 14 based on a receipt period of the control signal CS4 having the signal length L4.

As seen in FIG. 15, the remote controller RC4 has substantially the same structure and/or configuration as that of the remote controller RC1 of the first embodiment. The remote controller RC4 includes a processor RC41. The processor RC41 includes a CPU and a memory controller as well as the seatpost controller 440. The remote controller RC4 includes a remote memory RC42 storing the adjustment information IN4. The processor RC41 and the remote memory RC42 are mounted on a circuit board RC43 and are electrically connected to an internal conductor of the circuit board RC43. The circuit board RC43 is electrically connected to a bus RC44. The processor RC41 and the remote memory RC42 are electrically connected to the first PLC controller PC1, the seatpost operating switch SW1, and the upshift operating switch SW2 with the bus RC44 and the circuit board RC43.

The remote memory RC42 includes a ROM and a RAM as well as the seatpost memory 48. For example, the ROM includes a non-transitory computer-readable storage medium, and the RAM includes a transitory computer-readable storage medium. However, the structure of the remote memory RC42 is not limited to this embodiment. The remote memory RC42 includes storage areas each having an address in the ROM and the RAM. The remote controller RC4 controls the remote memory RC42 to store data in the storage areas of the remote memory RC42 and reads data from the storage areas of the remote memory RC42.

At least one program is stored in the remote memory RC42 (e.g., the ROM). The at least one program is read into the remote controller RC4, and thereby the configuration and/or algorithm of the remote controller RC4 is performed.

The remote controller RC4 has a normal mode and a setting mode. In the normal mode, the remote controller RC4 is configured to generate the control signal CS4 based on the adjustment period AP4. In the setting mode, the remote controller RC4 is configured to communicate with the external device ED. The remote controller RC4 is configured to communicate with the external device ED so that the user selects the adjustment period AP4 from the plurality of predetermined adjustment periods PP. The wireless communicators WC0 and WC3 are configured to execute pairing to establish wireless communication between the remote controller RC4 and the external device ED. The remote controller RC4 is configured to change the mode of the remote controller RC4 from the normal mode to the setting mode in response to completion of the pairing between the remote controller RC5 and the external device ED. In the normal mode, the seatpost controller 440 is configured to control the electric actuator 14 based on the adjustment period AP4 selected by using the external device ED from the plurality of predetermined adjustment periods PP stored in the remote memory RC42.

Figure 17:
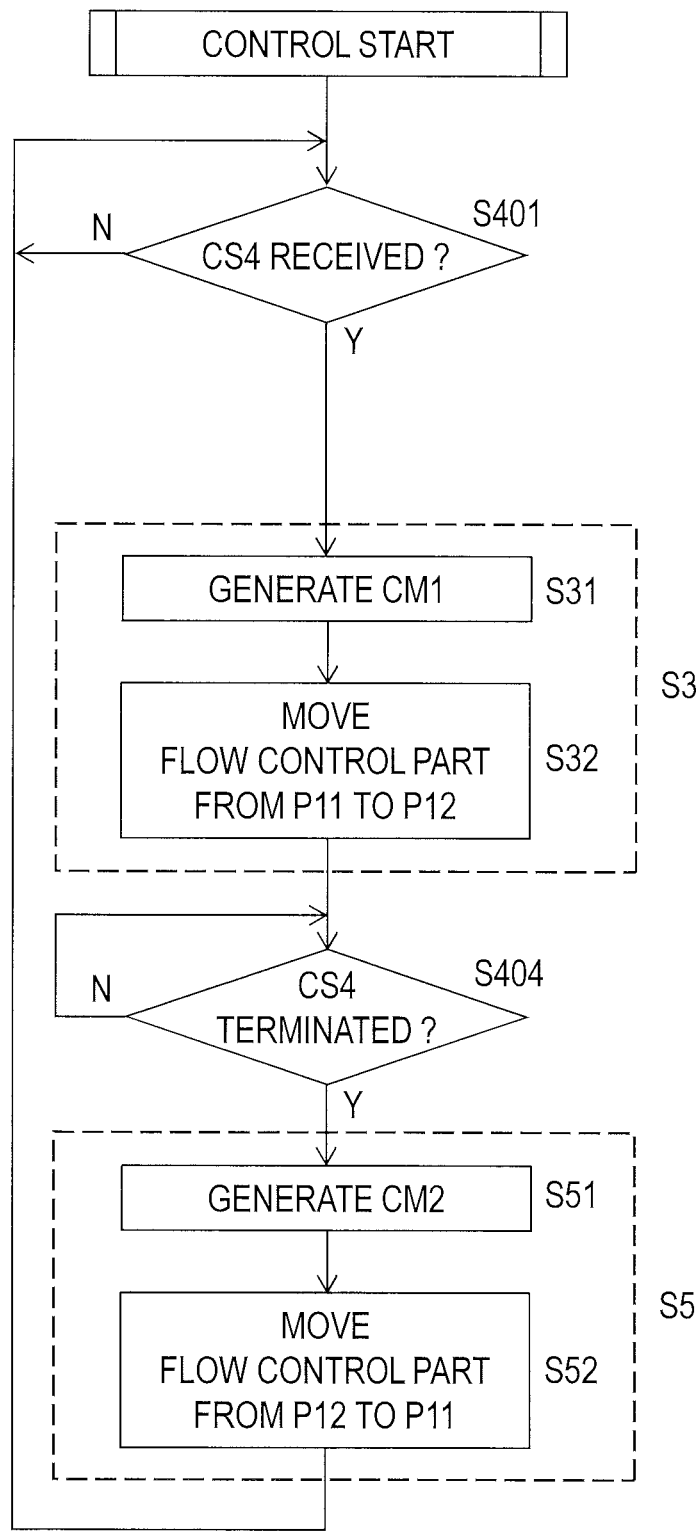
FIG. 17 is a flow chart of operation of the bicycle seatpost assembly illustrated in FIG. 14.

As seen in FIGS. 16 and 17, the seatpost controller 440 has substantially the same steps as those of the seatpost controller 40 of the first embodiment. In the normal mode, the seatpost controller 440 controls the electric actuator 14 to maintain the lock state while the seatpost controller 440 does not receive the control signal CS4 (step S401). The seatpost controller 440 generates the adjustment command CM1 without measuring the period MP when the seatpost controller 440 receives the control signal CS4 (steps S401 and S31). The actuator driver 44 is configured to control the electric actuator 14 to move the hydraulic valve 23 from the closed position P11 to the open position P12 in response to the adjustment command CM1 (step S32).

The seatpost controller 440 maintains the adjustable state until the seatpost controller 440 senses termination of the control signal CS4 (step S404). In the adjustable state, the rider can change the total length L1 of the bicycle seatpost assembly 412 by applying or releasing the rider's weight. The seatpost controller 440 generates the lock command CM2 when the seatpost controller 440 senses termination of the control signal CS4 (steps S404 and S51). The actuator driver 44 controls the electric actuator 14 to move the hydraulic valve 23 from the open position P12 to the closed position P11 in response to the lock command CM2 (step S52). Thus, the process returns to the step S401.

Fifth Embodiment

A bicycle seatpost system 511 including a bicycle seatpost assembly 512 in accordance with a fifth embodiment will be described below referring to FIGS. 18 to 21. The bicycle seatpost system 511 has the same structure and/or configuration as that of the bicycle seatpost system 411 except for the seatpost controller 440 and the remote controller RC4. Thus, elements having substantially the same function as those in the above embodiments will be numbered the same here, and will not be described and/or illustrated again in detail here for the sake of brevity.

Figure 18:
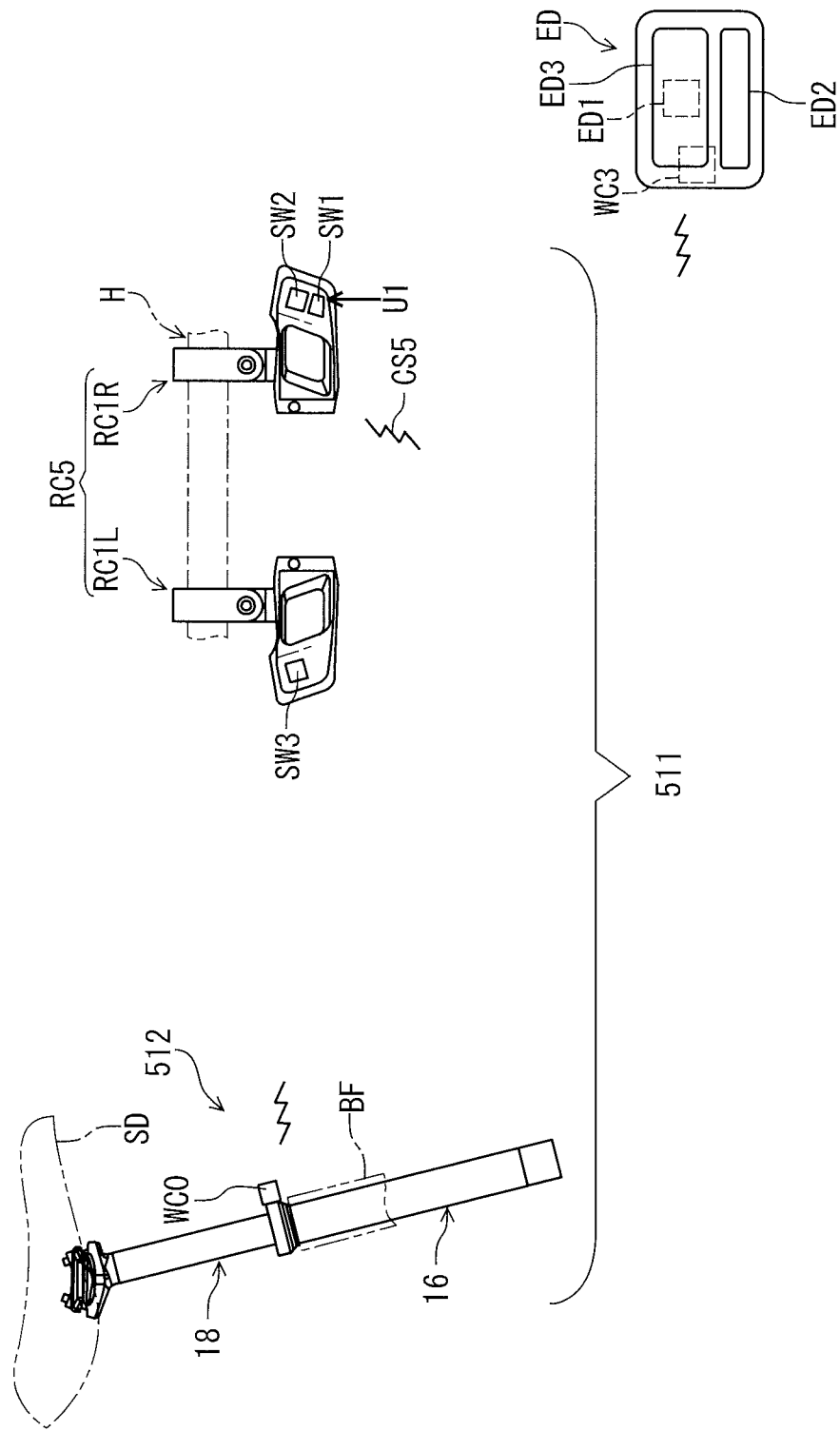
FIG. 18 is a schematic diagram of a bicycle control system including a bicycle seatpost assembly in accordance with a fifth embodiment.
Figure 19:
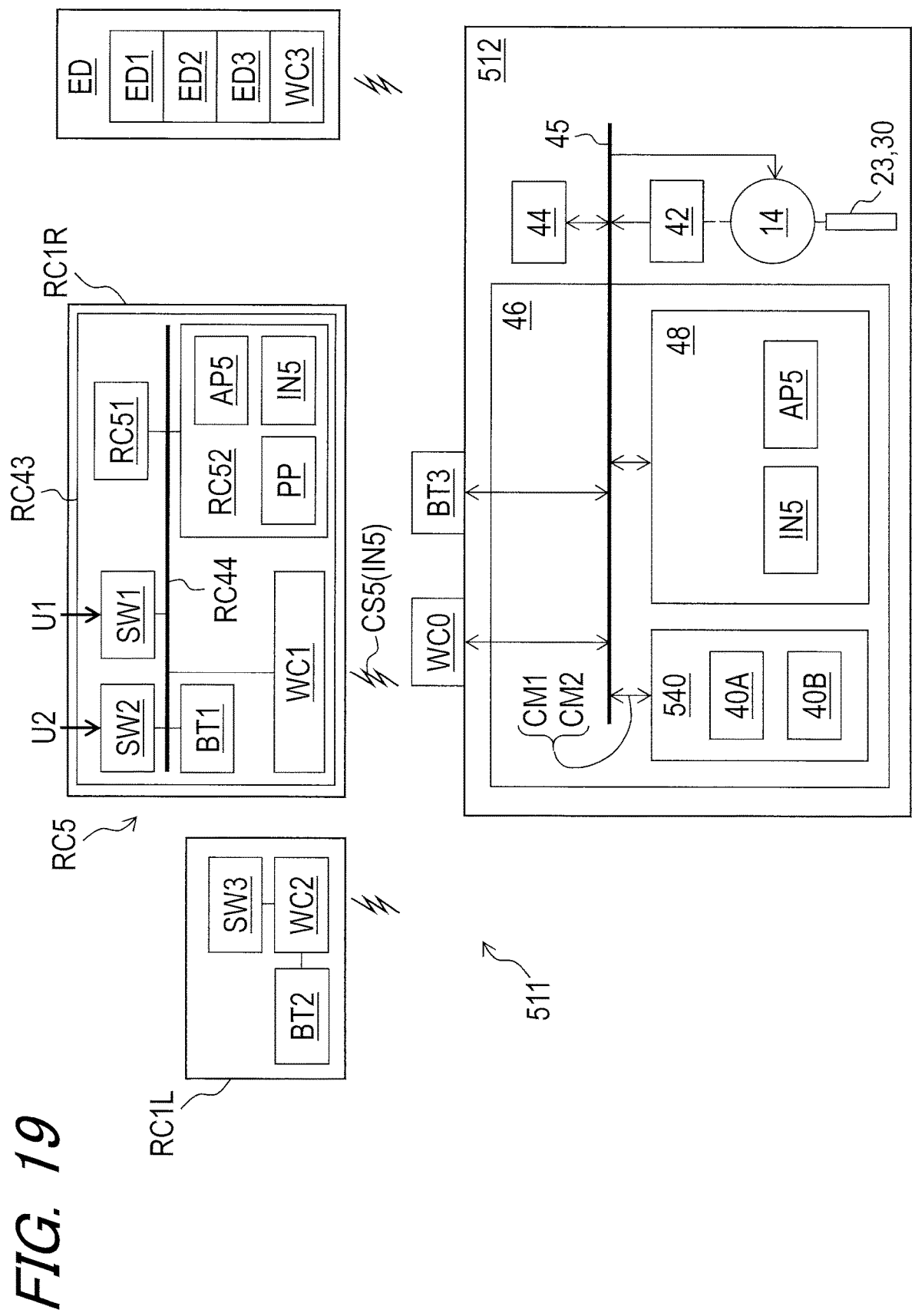
FIG. 19 is a block diagram of the bicycle control system illustrated in FIG. 18.

As seen in FIGS. 18 and 19, the bicycle seatpost system 511 includes the bicycle seatpost assembly 512 and a remote controller RC5. The bicycle seatpost assembly 512 comprises the electric actuator 14 and a seatpost controller 540. The seatpost controller 540 has substantially the same structure and/or configuration as that of the seatpost controller 440 of the fourth embodiment. The seatpost controller 540 is configured to control the electric actuator 14 to maintain the adjustable state during an adjustment period AP5 selectable from the plurality of predetermined adjustment periods PP.

In this embodiment, the seatpost controller 540 is configured to control the electric actuator 14 to maintain the adjustable state during the adjustment period AP5 based on a control signal CS5 from the remote controller RC5. The control signal CS5 includes adjustment information IN5 relating to the adjustment period AP5. As seen in FIG. 19, the remote controller RC5 is configured to generate the control signal CS5 including the adjustment information IN5 indicating a value of the adjustment period AP5.

As seen in FIG. 19, the remote controller RC5 has substantially the same structure and/or configuration as that of the remote controller RC4 of the fourth embodiment. The remote controller RC5 includes a processor RC51. The processor RC51 has substantially the same structure and/or configuration as that of the processor RC41 of the remote controller RC4. The remote controller RC5 includes a remote memory RC52 storing the adjustment information IN5. The remote memory RC52 has substantially the same structure and/or configuration as that of the remote memory RC42 of the remote controller RC4. The processor RC51 and the remote memory RC52 are mounted on the circuit board RC43 and are electrically connected to an internal conductor of the circuit board RC43. The processor RC51 and the remote memory RC52 are electrically connected to the first wireless communicator WC1, the first battery BT1, the seatpost operating switch SW1, and the upshift operating switch SW2 with the bus RC44 and the circuit board RC43.

At least one program is stored in the remote memory RC52 (e.g., the ROM). The at least one program is read into the remote controller RC5, and thereby the configuration and/or algorithm of the remote controller RC5 is performed.

Figure 20:
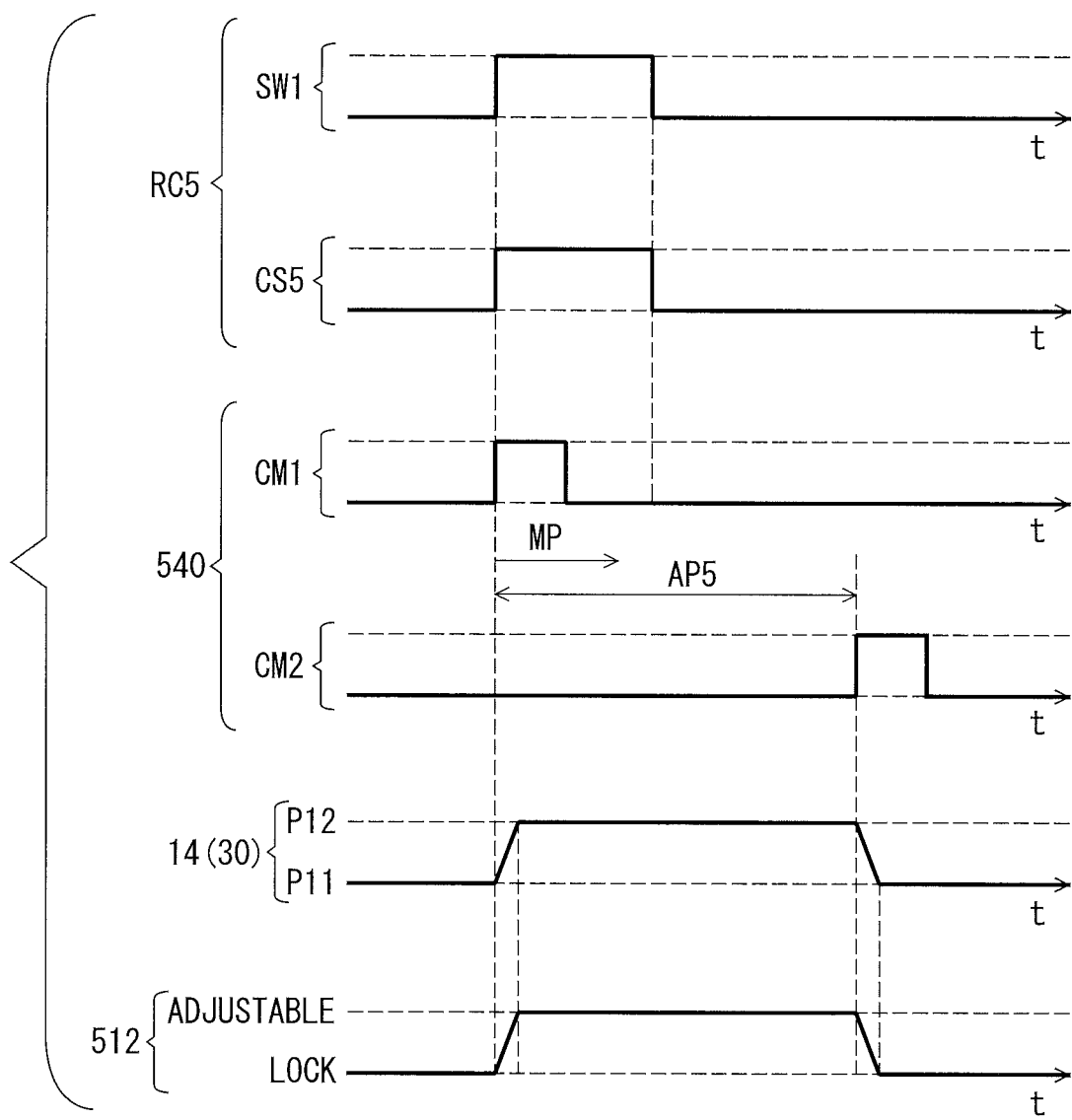
FIG. 20 is a timing chart of the bicycle control system illustrated in FIG. 18.

The remote controller RC5 has a normal mode and a setting mode. In the normal mode, the remote controller RC5 is configured to generate the control signal CS5 based on the adjustment period AP5. In the setting mode, the remote controller RC5 is configured to communicate with the external device ED. The remote controller RC5 is configured to communicate with the external device ED so that the user selects the adjustment period AP5 from the plurality of predetermined adjustment periods PP. The wireless communicators WC0 and WC3 are configured to execute pairing to establish wireless communication between the remote controller RC5 and the external device ED. The remote controller RC5 is configured to change the mode of the remote controller RC5 from the normal mode to the setting mode in response to completion of the pairing between the remote controller RC5 and the external device ED. In the normal mode, the seatpost controller 540 is configured to control the electric actuator 14 based on the adjustment period AP5 selected by using the external device ED from the plurality of predetermined adjustment periods PP stored in the remote memory RC52. As seen in FIG. 20, the seatpost controller 540 is configured to control the electric actuator 14 to maintain the adjustable state during the adjustment period AP5 based on the control signal CS5 having a constant length regardless of the adjustment information IN5.

Figure 21:
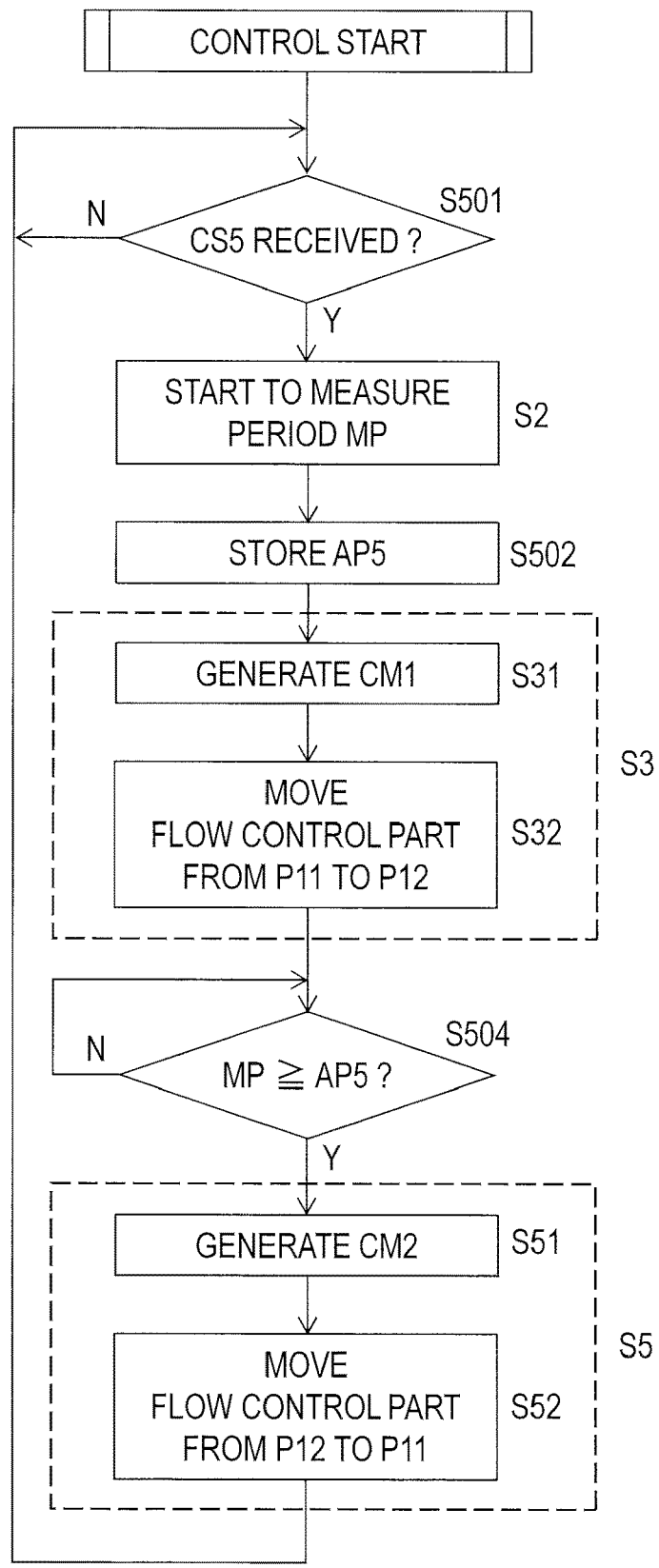
FIG. 21 is a flow chart of operation of the bicycle seatpost assembly illustrated in FIG. 18.

As seen in FIGS. 20 and 21, the seatpost controller 540 has substantially the same steps as those of the seatpost controller 440 of the fourth embodiment. In the normal mode, the seatpost controller 540 controls the electric actuator 14 to maintain the lock state while the seatpost controller 540 does not receive the control signal CS5 (step S501). The seatpost controller 540 starts to measure the period MP when the seatpost controller 540 receives the control signal CS5 (steps S501 and S2). The seatpost controller 540 calculates the adjustment period AP5 based on the adjustment information IN5 included in the control signal CS5 and stores the adjustment period AP5 in the seatpost memory 48 (step S502).

The seatpost controller 540 controls the electric actuator 14 to change the state of the bicycle seatpost assembly 12 from the lock state to the adjustable state when the seatpost controller 540 receives the control signal CS5 (step S3). In this embodiment, the seatpost controller 540 generates the adjustment command CM1 when the seatpost controller 540 receives the control signal CS5 (step S31). The actuator driver 44 is configured to control the electric actuator 14 to move the hydraulic valve 23 from the closed position P11 to the open position P12 in response to the adjustment command CM1 (step S32).

The seatpost controller 540 controls the electric actuator 14 to maintain the adjustable state until the adjustment period AP1 elapses from the timing at which the seatpost controller 540 receives the control signal CS5 (steps S504 and S5). In the adjustable state, the rider can change the total length L1 of the bicycle seatpost assembly 412 by applying or releasing the rider's weight. In this embodiment, the seatpost controller 540 compares the measured period MP with the adjustment period AP5 obtained in the step S502 (step S504). The seatpost controller 540 generates the lock command CM2 when the measured period MP is equal to or larger than the adjustment period AP1 (step S51). The actuator driver 44 controls the electric actuator 14 to move the hydraulic valve 23 from the open position P12 to the closed position P11 in response to the lock command CM2 (step S52). Thus, the process returns to the step S501.

Sixth Embodiment

A bicycle seatpost system 611 including a bicycle seatpost assembly 612 in accordance with a sixth embodiment will be described below referring to FIGS. 22 to 27. The bicycle seatpost system 611 has the same structures and/or configurations as those of the bicycle seatpost systems 211 and 411 except for the seatpost controllers 240 and 440 and the remote controllers RC2 and RC6. Thus, elements having substantially the same function as those in the above embodiments will be numbered the same here, and will not be described and/or illustrated again in detail here for the sake of brevity.

Figure 22:
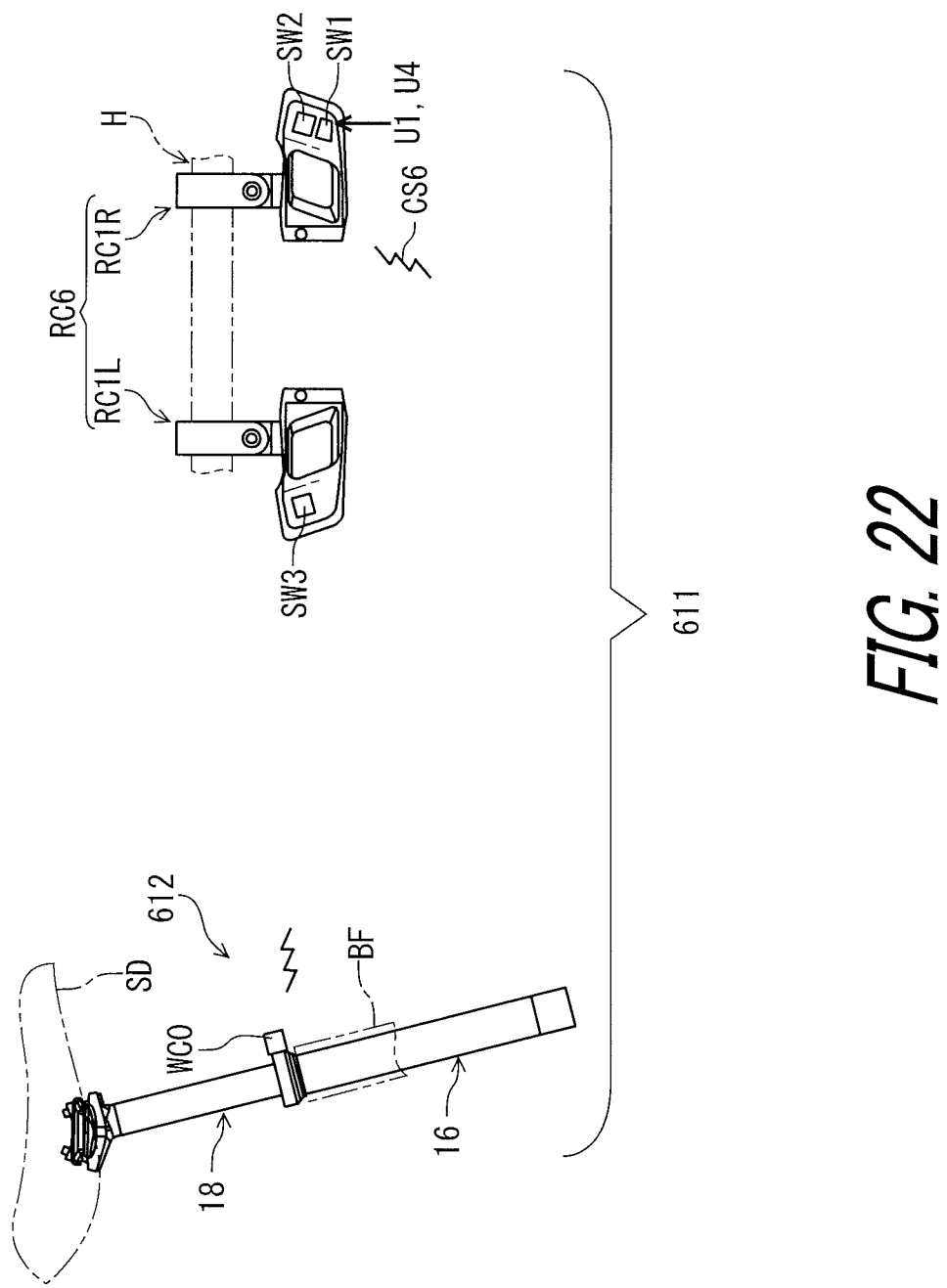
FIG. 22 is a schematic diagram of a bicycle control system including a bicycle seatpost assembly in accordance with a sixth embodiment.
Figure 23:
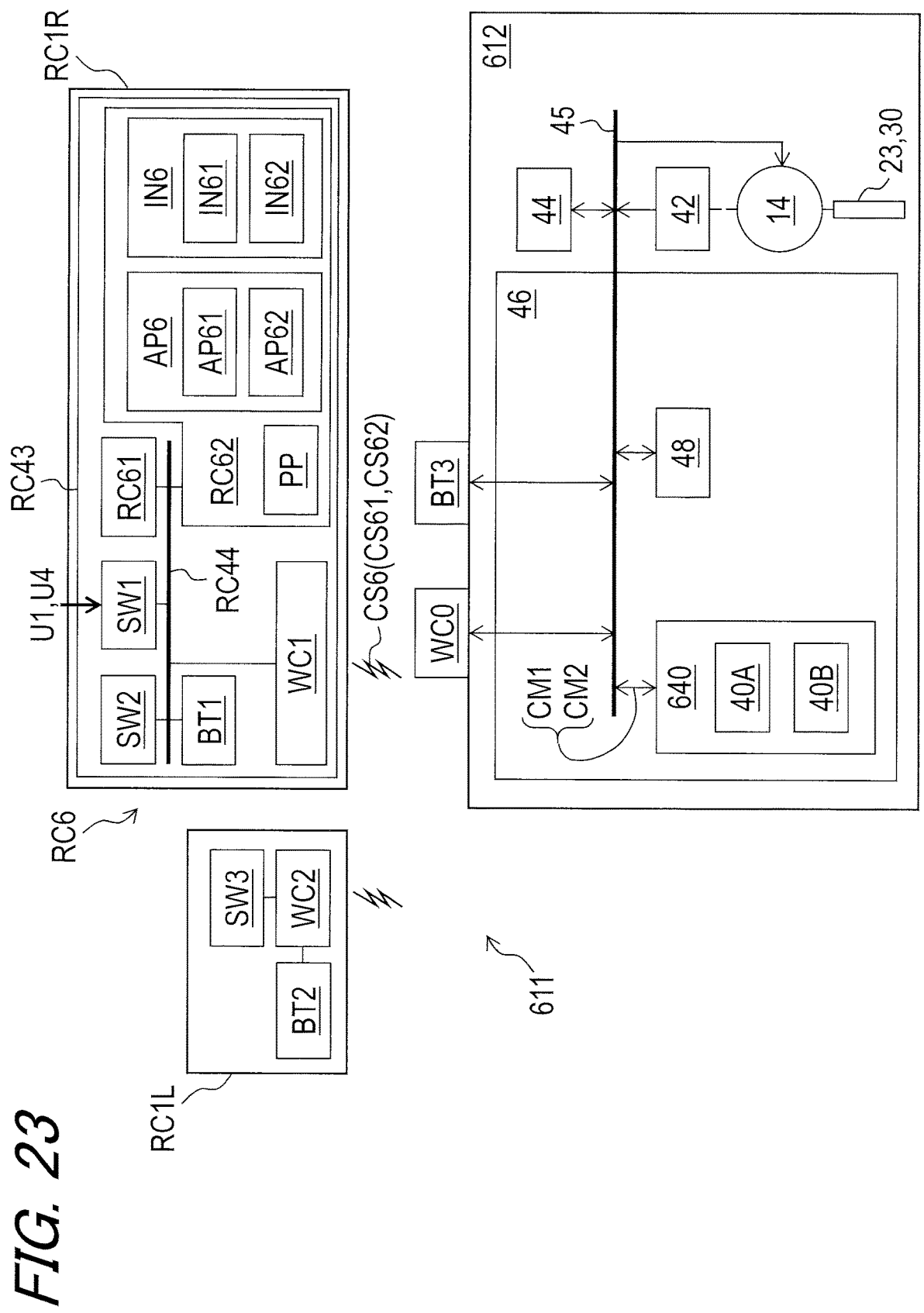
FIG. 23 is a block diagram of the bicycle control system illustrated in FIG. 22.

As seen in FIGS. 22 and 23, the bicycle seatpost system 611 includes the bicycle seatpost assembly 612 and a remote controller RC6. The bicycle seatpost assembly 612 comprises the electric actuator 14 and a seatpost controller 640. In this embodiment, the adjustment period can be changed via the remote controller RC6.

The seatpost controller 640 has substantially the same structure and/or configuration as that of the seatpost controller 240 of the second embodiment. The seatpost controller 640 is configured to control the electric actuator 14 to maintain the adjustable state during an adjustment period AP6 selectable from the plurality of predetermined adjustment periods PP.

Figure 24:
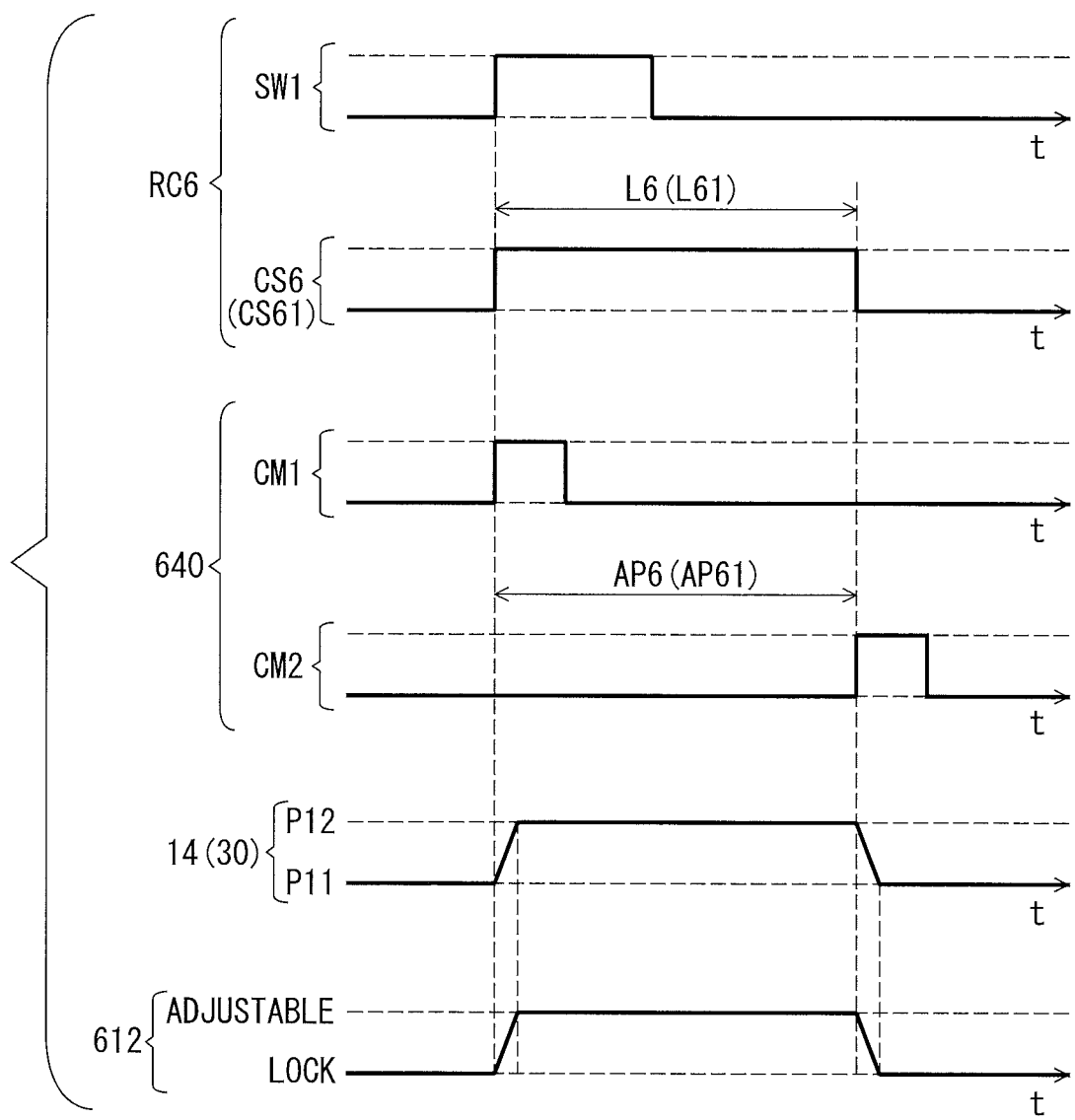
FIGS. 24 and 25 are timing charts of the bicycle control system illustrated in FIG. 22.
Figure 25:
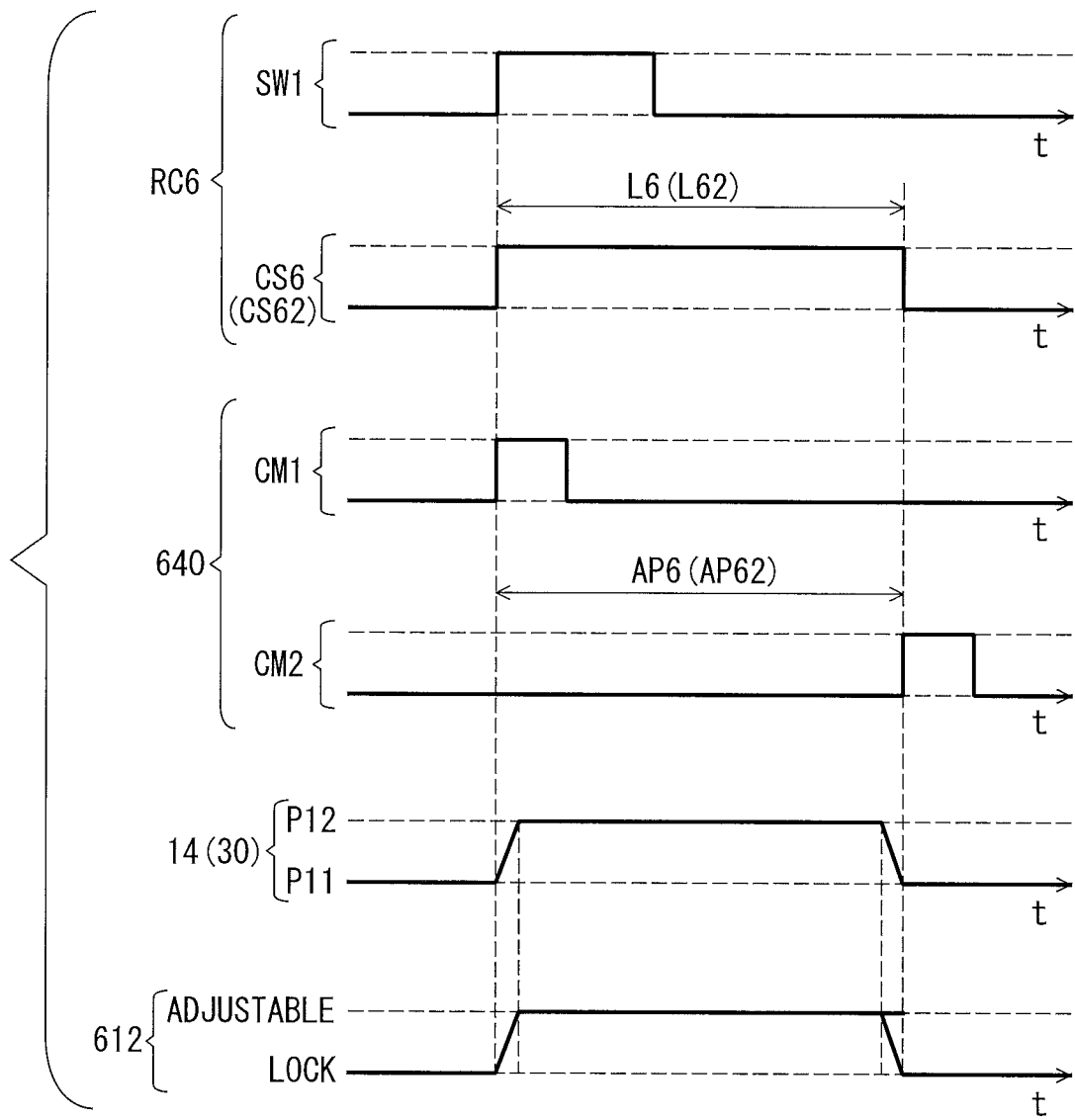

In this embodiment, the seatpost controller 640 is configured to control the electric actuator 14 to maintain the adjustable state during the adjustment period AP6 based on a control signal CS6 from a remote controller RC6. The control signal CS6 includes adjustment information IN6 relating to the adjustment period AP6. As seen in FIGS. 24 and 25, the adjustment information IN6 includes a signal length L6 of the control signal CS6. The seatpost controller 640 is configured to control the electric actuator 14 based on a receipt period of the control signal CS6 having the signal length L6.

As seen in FIG. 23, the remote controller RC6 has substantially the same structure and/or configuration as that of the remote controller RC4 of the fourth embodiment. The remote controller RC6 includes a processor RC61. The processor RC61 includes a CPU and a memory controller as well as the remote controller RC4. The remote controller RC6 includes a remote memory RC62 storing the adjustment information IN6. The remote memory RC62 has substantially the same structure and/or configuration as that of the remote memory RC42 of the remote controller RC4. The processor RC61 and the remote memory RC62 are mounted on the circuit board RC43 and are electrically connected to an internal conductor of the circuit board RC43. The processor RC61 and the remote memory RC62 are electrically connected to the first wireless communicator WC1, the first battery BT1, the seatpost operating switch SW1, and the upshift operating switch SW2 with the bus RC44 and the circuit board RC43.

At least one program is stored in the remote memory RC62 (e.g., the ROM). The at least one program is read into the remote controller RC6, and thereby the configuration and/or algorithm of the remote controller RC6 is performed.

In this embodiment, the seatpost controller 640 is configured to control the electric actuator 14 based on the adjustment period AP6 selected by using the remote controller RC6 from the plurality of predetermined adjustment periods PP stored in the remote memory RC62. The plurality of predetermined adjustment periods PP includes a first adjustment period AP61 and a second adjustment period AP62. The second adjustment period AP62 is different from the first adjustment period AP61. In this embodiment, the second adjustment period AP62 is longer than the first adjustment period AP61. The remote memory RC62 is configured to store the first adjustment period AP61 and the second adjustment period AP62.

In this embodiment, the control signal CS6 includes a first control signal CS61 and a second control signal CS62. The adjustment information IN6 includes first adjustment information IN61 and second adjustment information IN62. The adjustment period AP6 includes the first adjustment period AP61 and the second adjustment period AP62.

The remote controller RC has a first signal transmitting mode to transmit the first control signal CS61 including first adjustment information IN61 relating to the first adjustment period AP61, and a second signal transmitting mode to transmit the second control signal CS62 including second adjustment information IN62 relating to the second adjustment period AP62. The remote controller RC6 is configured to change a mode of the remote controller RC6 between the first signal transmitting mode and the second signal transmitting mode.

As seen in FIG. 24, the first adjustment information IN61 includes a first signal length L61 of the first control signal CS61. The seatpost controller 640 is configured to control the electric actuator 14 based on a receipt period of the first control signal CS61 having the first signal length L61.

As seen in FIG. 25, the second adjustment information IN62 includes a second signal length L62 of the second control signal CS62. The seatpost controller 640 is configured to control the electric actuator 14 based on a receipt period of the second control signal CS62 having the second signal length L62.

As seen in FIG. 23, in this embodiment, the remote controller RC6 is configured to change the mode of the remote controller RC6 between the first signal transmitting mode and the second signal transmitting mode based on the mode user input U4 received by the remote controller RC6. The remote controller RC6 has substantially the same structure as that of the remote controller RC1 of the first embodiment. The mode user input U4 includes a long press of the seatpost operating switch SW1. Namely, the seatpost operating switch SW1 is configured to generate the mode signal MS rather than the seatpost control signal CS1 in response to the long press of the seatpost operating switch SW1. The seatpost operating switch SW1 is configured to separately recognize the seatpost user input U1 and the mode user input U4 and is configured to separately generate the seatpost control signal CS1 and the mode signal MS.

The remote controller RC6 is configured to change the mode of the remote controller RC6 from the second signal transmitting mode to the first signal transmitting mode in response to the mode signal MS. The remote controller RC6 is configured to change the mode of the remote controller RC6 from the first signal transmitting mode to the second signal transmitting mode in response to the mode signal MS.

Figure 26:
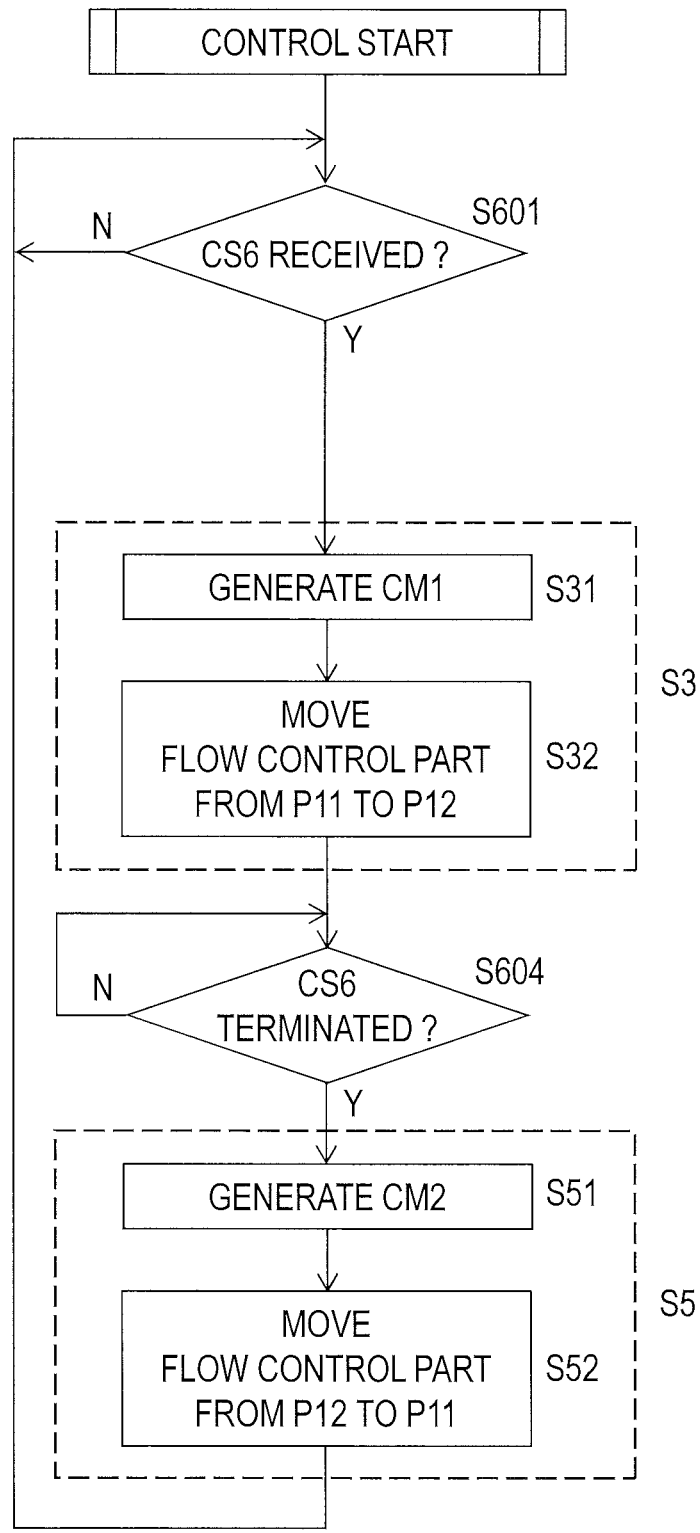
FIG. 26 is a flow chart of operation of the bicycle seatpost assembly illustrated in FIG. 22.

As seen in FIGS. 24 to 26, the seatpost controller 640 has substantially the same steps as those of the seatpost controller 440 of the fourth embodiment. In the normal mode, the seatpost controller 640 controls the electric actuator 14 to maintain the lock state while the seatpost controller 640 does not receive the control signal CS6 (one of the first control signal CS61 and the second control signal CS62) (step S601). The seatpost controller 640 generates the adjustment command CM1 without measuring the period MP when the seatpost controller 640 receives the control signal CS6 (one of the first control signal CS61 and the second control signal CS62) (steps S601 and S31). The actuator driver 44 is configured to control the electric actuator 14 to move the hydraulic valve 23 from the closed position P11 to the open position P12 in response to the adjustment command CM1 (step S32).

The seatpost controller 640 controls the electric actuator 14 to maintain the adjustable state until the seatpost controller 640 senses termination of the control signal CS6 (one of the first control signal CS61 and the second control signal CS62) (step S604). In the adjustable state, the rider can change the total length L1 of the bicycle seatpost assembly 612 by applying or releasing the rider's weight. Since the second signal length L62 is different from the first signal length L61, the rider can change the period during which the rider can change the total length L1 of the bicycle seatpost assembly 612 by applying or releasing the rider's weight.

The seatpost controller 640 generates the lock command CM2 when the seatpost controller 640 senses termination of the control signal CS6 (one of the first control signal CS61 and the second control signal CS62) (steps S604 and S51). The actuator driver 44 controls the electric actuator 14 to move the hydraulic valve 23 from the open position P12 to the closed position P11 in response to the lock command CM2 (step S52). Thus, the process returns to the step S601.

Seventh Embodiment

A bicycle seatpost system 711 including a bicycle seatpost assembly 712 in accordance with a fifth embodiment will be described below referring to FIGS. 27 to 30. The bicycle seatpost system 711 has the same structure and/or configuration as that of the bicycle seatpost system 611 except for the seatpost controller 640 and the remote controller RC6. Thus, elements having substantially the same function as those in the above embodiments will be numbered the same here, and will not be described and/or illustrated again in detail here for the sake of brevity.

Figure 27:
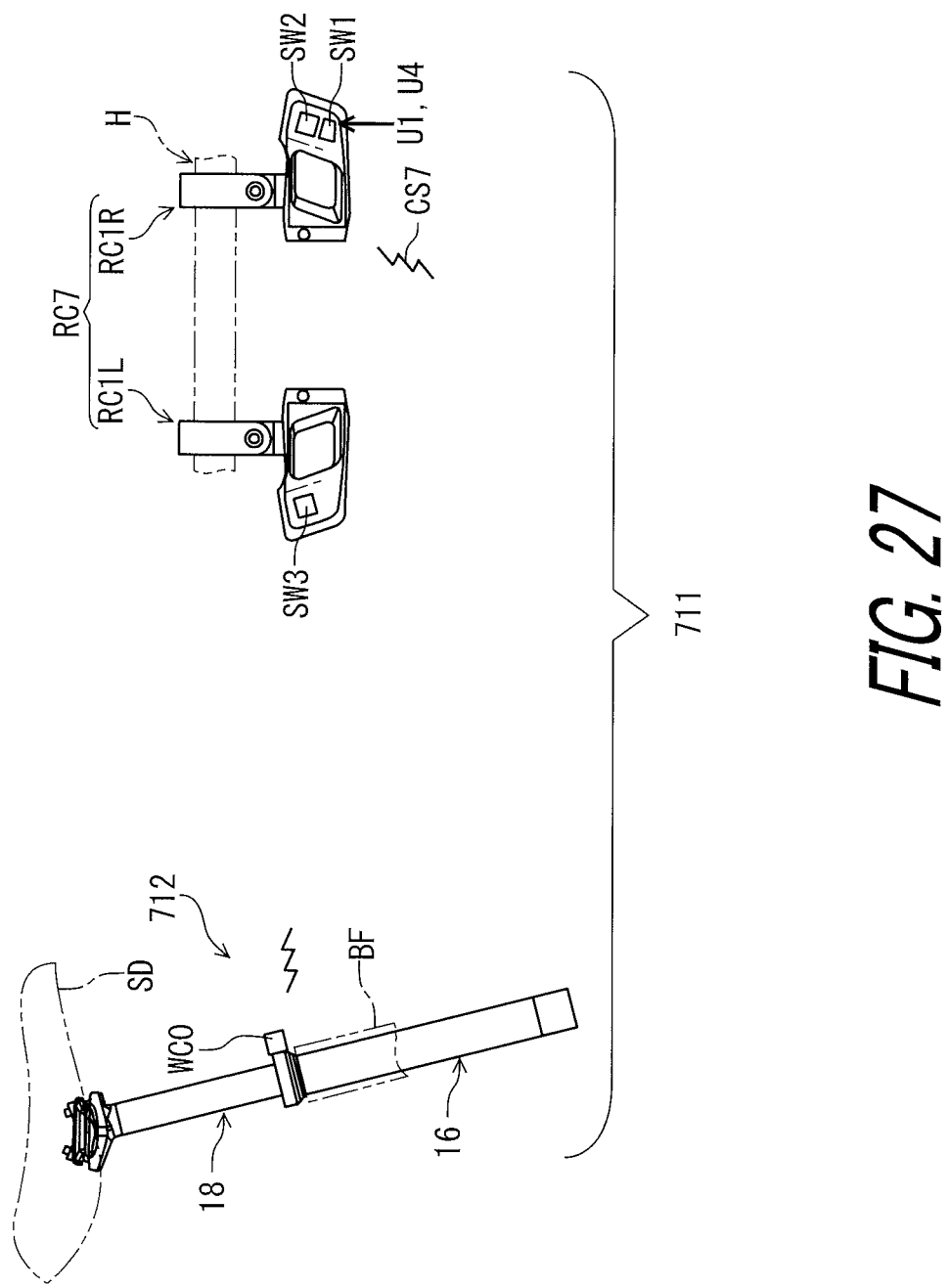
FIG. 27 is a schematic diagram of a bicycle control system including a bicycle seatpost assembly in accordance with a seventh embodiment.
Figure 28:
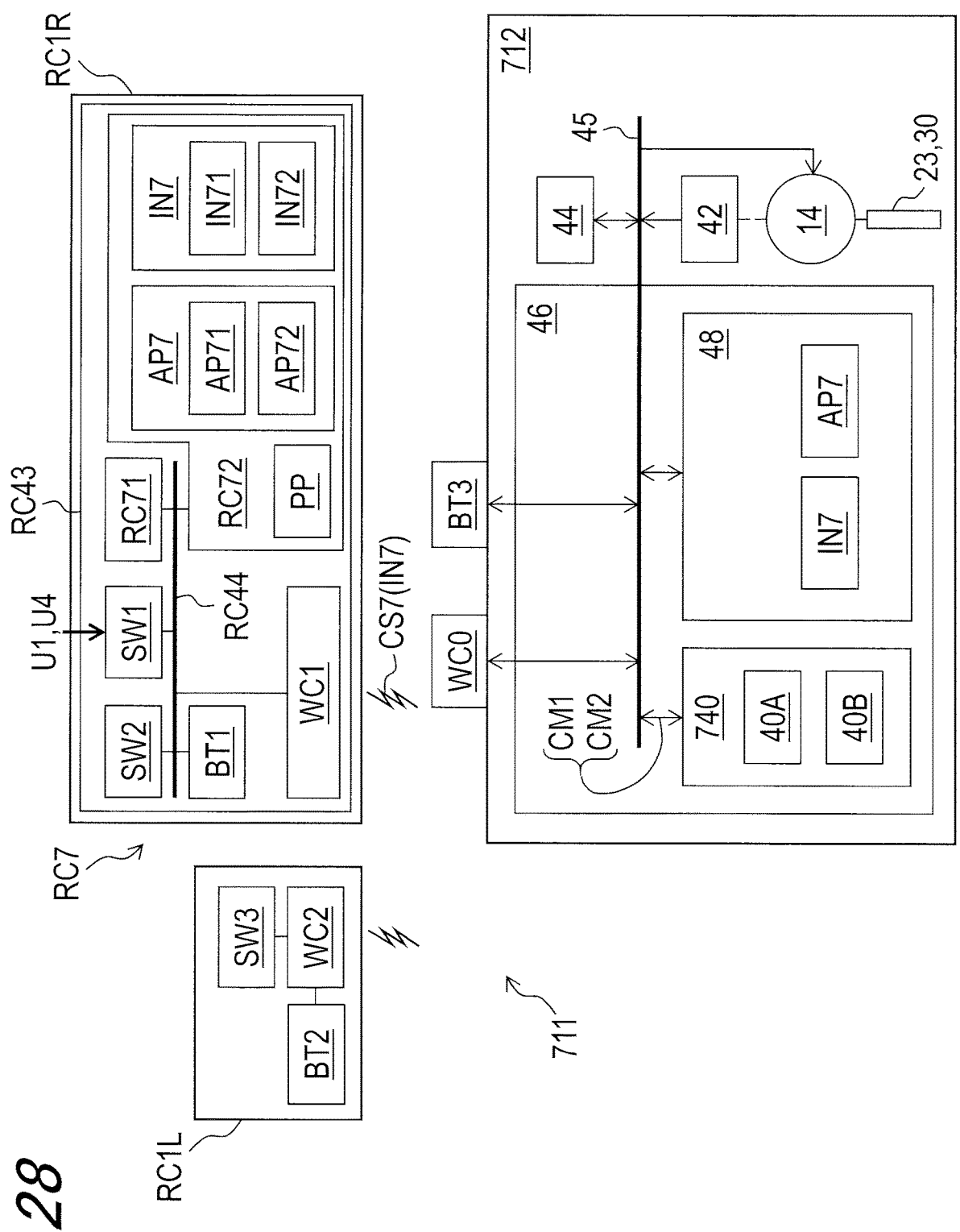
FIG. 28 is a block diagram of the bicycle control system illustrated in FIG. 27.

As seen in FIGS. 27 and 28, the bicycle seatpost system 711 includes the bicycle seatpost assembly 712 and a remote controller RC7. The bicycle seatpost assembly 712 comprises the electric actuator 14 and a seatpost controller 740. The seatpost controller 740 has substantially the same structure and/or configuration as that of the seatpost controller 640 of the sixth embodiment. The seatpost controller 740 is configured to control the electric actuator 14 to maintain the adjustable state during an adjustment period AP7 selectable from the plurality of predetermined adjustment periods PP.

Figure 29:
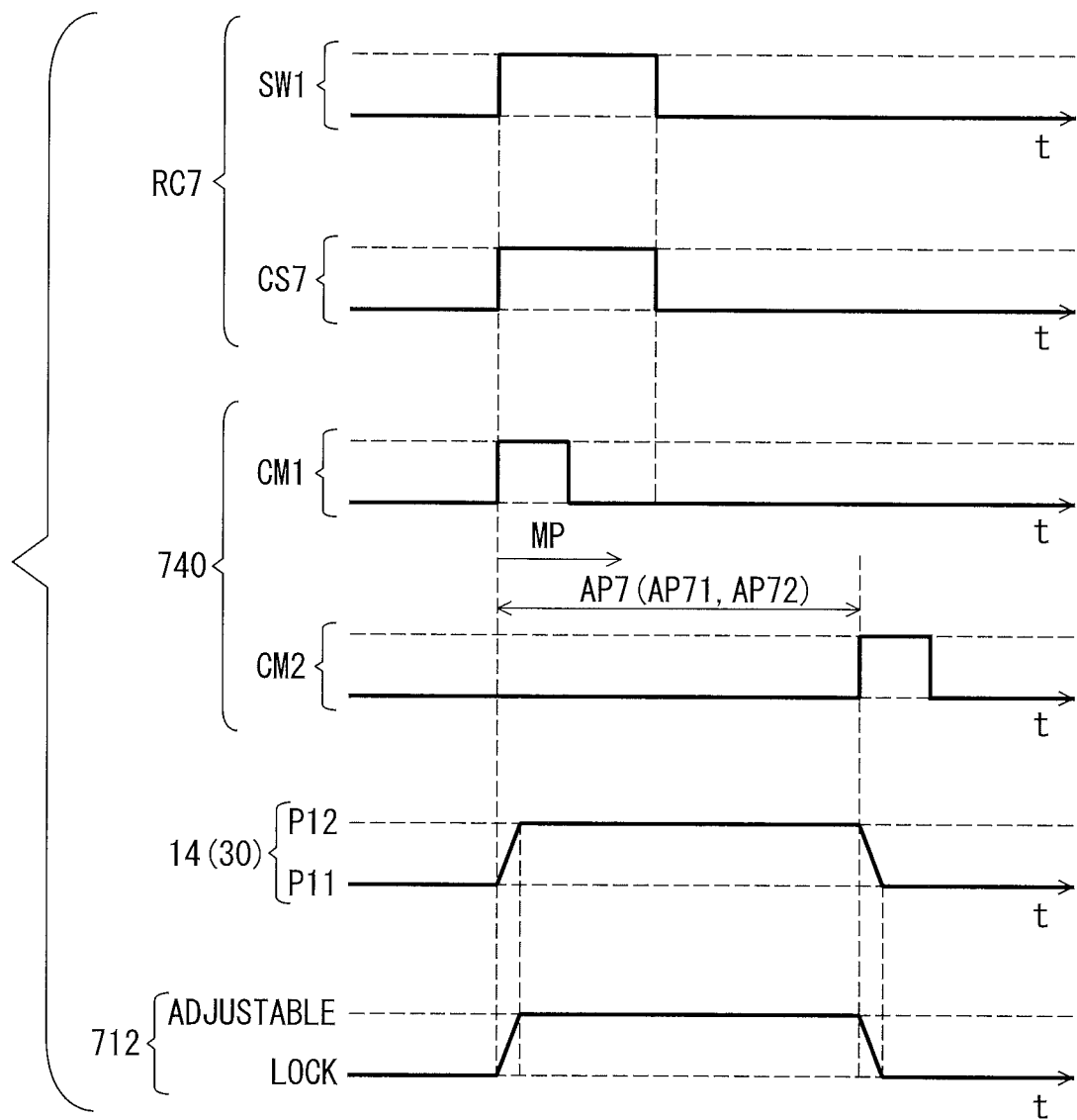
FIG. 29 is a timing chart of the bicycle control system illustrated in FIG. 27.

In this embodiment, the seatpost controller 740 is configured to control the electric actuator 14 to maintain the adjustable state during the adjustment period AP7 based on a control signal CS7 from a remote controller RC7. The control signal CS7 includes adjustment information IN7 relating to the adjustment period AP7. As seen in FIG. 29, the remote controller RC7 is configured to generate the control signal CS7 including a value of the adjustment period AP7.

As seen in FIG. 28, the remote controller RC7 has substantially the same structure and/or configuration as that of the remote controller RC6 of the sixth embodiment. the remote controller RC7 includes a processor RC71. The processor RC71 has substantially the same structure and/or configuration as that of the processor RC61 of the remote controller RC6. The remote controller RC7 includes a remote memory RC72 storing the adjustment information IN7. The remote memory RC72 has substantially the same structure and/or configuration as that of the remote memory RC62 of the remote controller RC6. The processor RC71 and the remote memory RC72 are mounted on the circuit board RC43 and are electrically connected to an internal conductor of the circuit board RC43. The processor RC71 and the remote memory RC72 are electrically connected to the first PLC controller PC1, the seatpost operating switch SW1, and the upshift operating switch SW2 with the bus RC44 and the circuit board RC43.

At least one program is stored in the remote memory RC72 (e.g., the ROM). The at least one program is read into the remote controller RC7, and thereby the configuration and/or algorithm of the remote controller RC7 is performed.

In this embodiment, the seatpost controller 740 is configured to control the electric actuator 14 based on the adjustment period AP7 selected by using the remote controller RC7 from the plurality of predetermined adjustment periods PP stored in the remote memory RC72. The plurality of predetermined adjustment periods PP includes a first adjustment period AP71 and a second adjustment period AP72. The second adjustment period AP72 is different from the first adjustment period AP71. In this embodiment, the second adjustment period AP72 is longer than the first adjustment period AP71. The remote memory RC72 is configured to store the first adjustment period AP71 and the second adjustment period AP72.

As seen in FIG. 28, in this embodiment, the remote controller RC7 has a first signal transmitting mode and a second signal transmitting mode. In the first signal transmitting mode, the remote controller RC7 is configured to generate the control signal CS7 including first adjustment information IN71 indicating a value of the first adjustment period AP71. In the second signal transmitting mode, the remote controller RC7 is configured to generate the control signal CS7 including second adjustment information IN72 indicating a value of the second adjustment period AP72. The remote controller RC7 is configured to generate the control signal CS7 having a constant length regardless of the first adjustment information IN71 and the second adjustment information IN72.

As seen in FIG. 29, the seatpost controller 740 is configured to control the electric actuator 14 to maintain the adjustable state during the adjustment period AP7 based on the control signal CS7 having a constant length regardless of the adjustment information IN7. In this embodiment, the seatpost controller 740 is configured to control the electric actuator 14 to maintain the adjustable state during the first adjustment period AP71 in response to the control signal CS7 including the first adjustment information IN71. The seatpost controller 740 is configured to control the electric actuator 14 to maintain the adjustable state during the second adjustment period AP72 in response to the control signal CS7 including the second adjustment information IN72. The seatpost controller 740 is configured to recognize one of the first adjustment information IN71 and the second adjustment information IN72 from the control signal CS7 when receiving the control signal CS7 from the remote controller RC7.

As seen in FIG. 28, the remote controller RC7 is configured to change the mode of the remote controller RC7 between the first signal transmitting mode and the second signal transmitting mode based on the mode user input U4 received by the remote controller RC7. The remote controller RC7 has substantially the same structure as that of the remote controller RC6 of the sixth embodiment. The mode user input U4 includes a long press of the seatpost operating switch SW1. Namely, the seatpost operating switch SW1 is configured to generate the mode signal MS rather than the seatpost control signal CS1 in response to the long press of the seatpost operating switch SW1. The seatpost operating switch SW1 is configured to separately recognize the seatpost user input U1 and the mode user input U4 and is configured to separately generate the seatpost control signal CS1 and the mode signal MS.

The remote controller RC7 is configured to change the mode of the remote controller RC7 from the second signal transmitting mode to the first signal transmitting mode in response to the mode signal MS. The remote controller RC7 is configured to change the mode of the remote controller RC7 from the first signal transmitting mode to the second signal transmitting mode in response to the mode signal MS.

Figure 30:
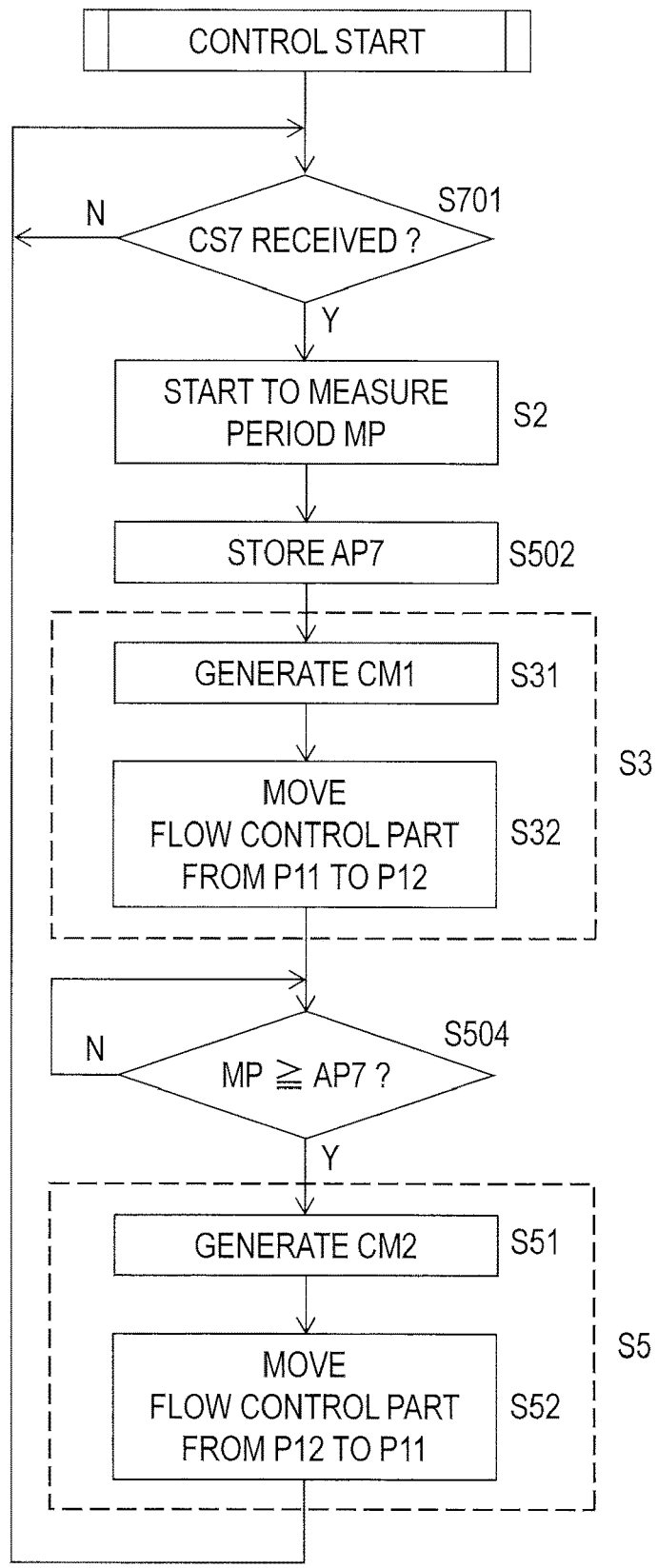
FIG. 30 is a flow chart of operation of the bicycle seatpost assembly illustrated in FIG. 27.

As seen in FIGS. 29 and 30, the seatpost controller 740 has substantially the same steps as those of the seatpost controller 540 of the fifth embodiment. In the normal mode, the seatpost controller 40 controls the electric actuator 14 to maintain the lock state while the seatpost controller 40 does not receive the control signal CS7 (step S701). The seatpost controller 40 starts to measure a period MP when the seatpost controller 40 receives the control signal CS7 (steps S701 and S2). The seatpost controller 540 calculates the adjustment period AP7 based on the adjustment information IN7 included in the control signal CS7 and stores the adjustment period AP7 in the seatpost memory 48 (step S502). More specifically, the seatpost controller 540 calculates the first adjustment period AP71 based on the first adjustment information IN71 included in the control signal CS7 and stores the first adjustment period AP71 in the seatpost memory 48. The seatpost controller 540 calculates the second adjustment period AP72 based on the second adjustment information IN72 included in the control signal CS7 and stores the second adjustment period AP72 in the seatpost memory 48.

The seatpost controller 740 controls the electric actuator 14 to change the state of the bicycle seatpost assembly 12 from the lock state to the adjustable state when the seatpost controller 740 receives the control signal CS7 (step S3). In this embodiment, the seatpost controller 740 generates the adjustment command CM1 when the seatpost controller 740 receives the control signal CS7 (step S31). The actuator driver 44 is configured to control the electric actuator 14 to move the hydraulic valve 23 from the closed position P11 to the open position P12 in response to the adjustment command CM1 (step S32).

The seatpost controller 740 controls the electric actuator 14 to maintain the adjustable state until the adjustment period AP7 elapses from the timing at which the seatpost controller 740 receives the control signal CS7 (steps S704 and S5). More specifically, the seatpost controller 740 controls the electric actuator 14 to maintain the adjustable state until the first adjustment period AP71 elapses from the timing at which the seatpost controller 740 receives the control signal CS7 including the first adjustment information IN71. The seatpost controller 740 controls the electric actuator 14 to maintain the adjustable state until the second adjustment period AP72 elapses from the timing at which the seatpost controller 740 receives the control signal CS7 including the second adjustment information IN72. In the adjustable state, the rider can change the total length L1 of the bicycle seatpost assembly 712 by applying or releasing the rider's weight.

In this embodiment, the seatpost controller 740 compares the measured period MT with the adjustment period AP7 (step S704). More specifically, the seatpost controller 740 compares the measured period MG' with the first adjustment period AP71 in a case where the control signal CS7 includes the first adjustment information IN71. The seatpost controller 740 compares the measured period MP with the second adjustment period AP72 in a case where the control signal CS7 includes the second adjustment information IN72. The seatpost controller 740 generates the lock command CM2 when the measured period MP is equal to or larger than the adjustment period AP7 (one of the first adjustment period AP71 and the second adjustment period AP72) (step S51). The actuator driver 44 controls the electric actuator 14 to move the hydraulic valve 23 from the open position P12 to the closed position P11 in response to the lock command CM2 (step S52). Thus, the process returns to the step S701.

Modifications

Each of the bicycle seatpost assemblies 12 to 712 can include another positioning structure such as a ratchet structure instead of or in addition to the positioning structure 20. In a case where the positioning structure includes a ratchet structure, the electric actuator 14 moves a ratchet of the ratchet structure between a lock position and a release position to change a state of the ratchet structure between a lock state and a release state. The lock state of the ratchet structure corresponds to the lock state of one of the bicycle seatpost assemblies 12 to 712. The release state of the ratchet structure corresponds to the adjustable state of one of the bicycle seatpost assemblies 12 to 712.

In the above embodiments, the wireless communicator WC0, the first wireless communicator WC1, and the second wireless communicator WC2 wirelessly connect the remote controller to the bicycle seatpost assembly. However, the PLC technology can be used instead of or in addition to the wireless technology. For example, the remote controller can be connected to the bicycle seatpost assembly with the electric communication path CP without the wireless communicators. In the first embodiment, the electric communication path CP connects the bicycle seatpost assembly 12, the rear derailleur RD, and the battery holder 60. However, the electric communication path CP can be at least partly replaced with the wireless technology. For example, the bicycle seatpost assembly can be connected to the rear derailleur RD using the wireless technology. In such an embodiment, the bicycle seatpost assembly and the rear derailleur RD each include a battery. Furthermore, the external device ED can be connected to the bicycle seatpost assembly, the remote controller, and the rear derailleur RD with wireless technology, the PLC technology, of a combination thereof.

Figure 31:
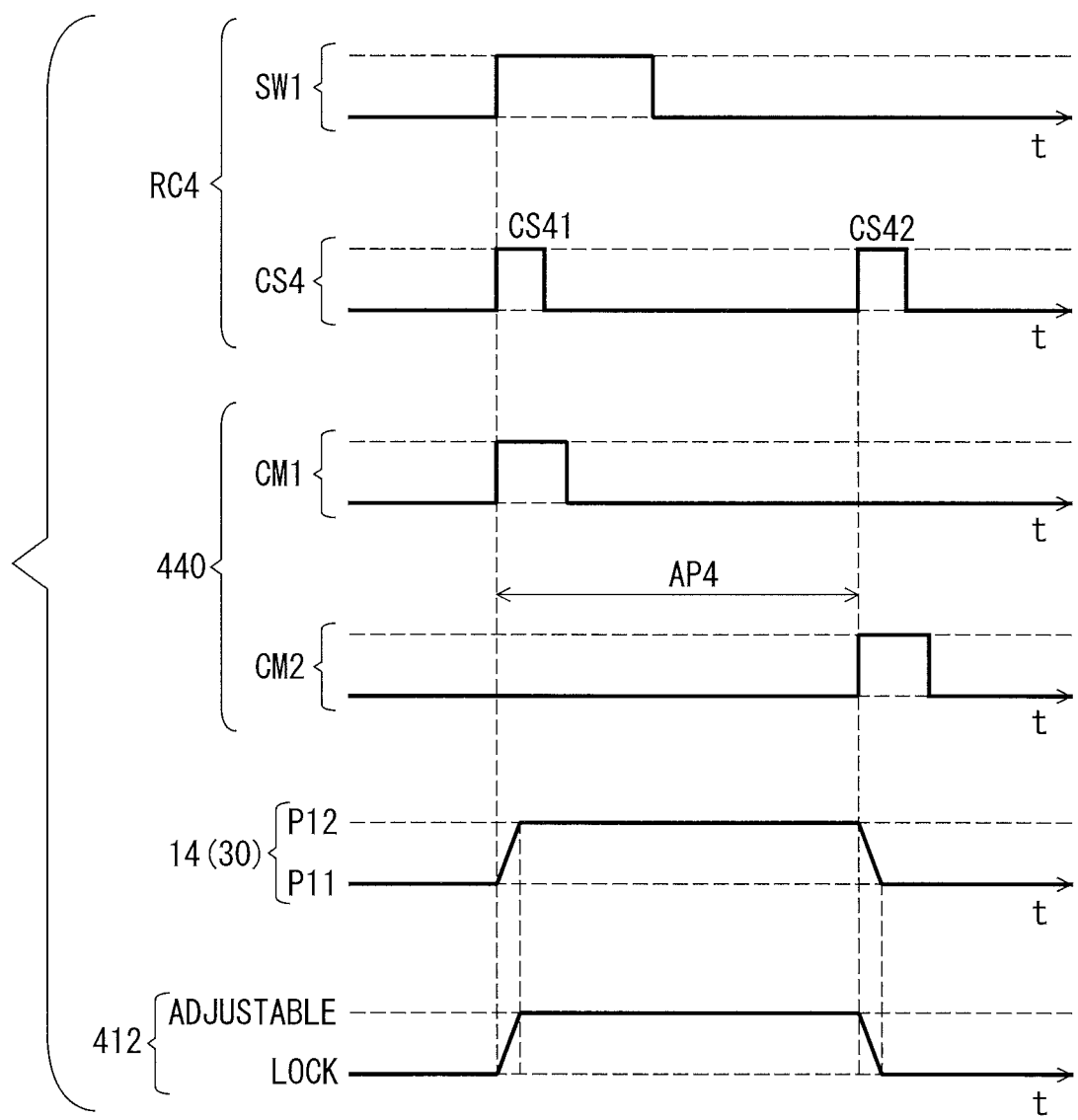
FIG. 31 is a timing chart of a modification of the bicycle control system illustrated in FIG. 14.

In the fourth and sixth embodiments, the seatpost controllers 440 and 460 are configured to sense the termination of the control signals CS4 and CS6 to generate the lock command CM2, respectively. As seen in FIG. 31, however, the remote controller RC4 of the fourth embodiment can be configured to generate an adjustment control signal CS41 and a lock control signal CS42 as the control signal CS4. The remote controller RC4 generates the lock control signal CS42 after the adjustment period AP4 elapsed from generation of the adjustment control signal CS41. The seatpost controller 440 generates the adjustment command CM1 in response to the adjustment control signal CS41 and generates the lock command CM2 in response to the lock control signal CS42. The same configuration can apply to the sixth embodiment.

While the rear derailleur RD is omitted from the bicycle control system in the second to seventh embodiments, the bicycle control systems of the second to seventh embodiments can include the rear derailleur RD and/or other components.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
   an electric actuator to change a state of the bicycle seatpost assembly between
   a lock state where a total length of the bicycle seatpost assembly is invariable, and
   an adjustable state where the total length of the bicycle seatpost assembly is variable, the adjustable state allows the total length to be adjustable by a user;
   a seatpost memory; and
   a seatpost controller configured to control, based on an adjustment period selected from a plurality of predetermined adjustment periods stored in the seatpost memory, the electric actuator to maintain the adjustable state during the selected adjustment period.

2. The bicycle seatpost assembly according to claim 1, wherein
   the seatpost memory is configured to communicate with an external device and is configured to store the adjustment period selected from the plurality of predetermined adjustment periods by using the external device.

3. The bicycle seatpost assembly according to claim 1, wherein
   the seatpost memory is configured to communicate with an external device, and
   the seatpost controller is configured to control the electric actuator based on the adjustment period selected from the plurality of predetermined adjustment periods by using the external device.

4. The bicycle seatpost assembly according to claim 1, wherein
   the plurality of predetermined adjustment periods includes a first adjustment period and a second adjustment period,
   the seatpost controller has
   a first control mode to control the electric actuator based on the first adjustment period, and
   a second control mode to control the electric actuator based on the second adjustment period, and
   the seatpost controller is configured to change a mode of the seatpost controller between the first control mode and the second control mode.

5. The bicycle seatpost assembly according to claim 4, wherein
   the seatpost controller is configured to change the mode of the seatpost controller between the first control mode and the second control mode based on an input from a remote controller.

6. The bicycle seatpost assembly according to claim 1, wherein
   the seatpost controller is configured to control the electric actuator to maintain the adjustable state during the adjustment period based on a control signal from a remote controller, and
   the control signal includes adjustment information relating to the adjustment period.

7. The bicycle seatpost assembly according to claim 6, wherein
   the remote controller includes a remote memory storing the adjustment information.

8. The bicycle seatpost assembly according to claim 7, wherein
   the seatpost controller is configured to control the electric actuator based on the adjustment period selected by using the remote controller from the plurality of predetermined adjustment periods stored in the remote memory.

9. The bicycle seatpost assembly according to claim 7, wherein the plurality of predetermined adjustment periods includes a first adjustment period and a second adjustment period, the remote controller has
- a first signal transmitting mode to transmit a first control signal including first adjustment information relating to the first adjustment period, and
- a second signal transmitting mode to transmit a second control signal including second adjustment information relating to the second adjustment period, and the remote controller is configured to change a mode of the remote controller between the first signal transmitting mode and the second signal transmitting mode.

10. The bicycle seatpost assembly according to claim 9, wherein
the remote controller is configured to change the mode of the remote controller between the first signal transmitting mode and the second signal transmitting mode based on a mode user input received by the remote controller.

11. The bicycle seatpost assembly according to claim 7, wherein
the remote controller is configured to communicate with an external device, and
the seatpost controller is configured to control the electric actuator based on the adjustment period selected by using the external device from the plurality of predetermined adjustment periods stored in the remote memory.

12. The bicycle seatpost assembly according to claim 6, wherein
the adjustment information includes a signal length of the control signal, and
the seatpost controller is configured to control the electric actuator based on a receipt period of the control signal having the length of period.

13. The bicycle seatpost assembly according to claim 6, wherein
the seatpost controller is configured to control the electric actuator to maintain the adjustable state during the adjustment period based on the control signal having a constant length.

14. The bicycle seatpost assembly according to claim 1, further comprising
a positioning structure including
- a passageway, and
- a hydraulic valve to open and close the passageway, wherein the positioning structure has
- an open state where the hydraulic valve opens the passageway, and
- a closed state where the hydraulic valve closes the passageway, and the seatpost controller is configured to control the electric actuator to maintain the open state during the adjustment period.

15. A bicycle seatpost assembly comprising:
an electric actuator to change a state of the bicycle seatpost assembly between
- a lock state where a total length of the bicycle seatpost assembly is invariable, and
- an adjustable state where the total length of the bicycle seatpost assembly is variable, the adjustable state allows the total length to be adjustable by a user; and a seatpost controller configured to control, based on an adjustment period selected from a plurality of predetermined adjustment periods, the electric actuator to maintain the adjustable state during the selected adjustment period, wherein the plurality of predetermined adjustment periods includes a first adjustment period and a second adjustment period, the seatpost controller has
- a first control mode to control the electric actuator based on the first adjustment period, and
- a second control mode to control the electric actuator based on the second adjustment period, and the seatpost controller is configured to change a mode of the seatpost controller between the first control mode and the second control mode.

16. A bicycle seatpost assembly comprising:
an electric actuator to change a state of the bicycle seatpost assembly between
- a lock state where a total length of the bicycle seatpost assembly is invariable, and
- an adjustable state where the total length of the bicycle seatpost assembly is variable, the adjustable state allows the total length to be adjustable by a user; and a seatpost controller configured to control, based on an adjustment period selected from a plurality of predetermined adjustment periods, the electric actuator to maintain the adjustable state during the selected adjustment period, wherein the seatpost controller is configured to control the electric actuator to maintain the adjustable state during the adjustment period based on a control signal from a remote controller, the control signal includes adjustment information relating to the adjustment period, the remote controller includes a remote memory storing the adjustment information, and the seatpost controller is configured to control the electric actuator based on the adjustment period selected by using the remote controller from the plurality of predetermined adjustment periods stored in the remote memory.

17. A bicycle seatpost assembly comprising:
an electric actuator to change a state of the bicycle seatpost assembly between
- a lock state where a total length of the bicycle seatpost assembly is invariable, and
- an adjustable state where the total length of the bicycle seatpost assembly is variable, the adjustable state allows the total length to be adjustable by a user; and a seatpost controller configured to control, based on an adjustment period selected from a plurality of predetermined adjustment periods, the electric actuator to maintain the adjustable state during the selected adjustment period, wherein the seatpost controller is configured to control the electric actuator to maintain the adjustable state during the adjustment period based on a control signal from a remote controller, the control signal includes adjustment information relating to the adjustment period, the remote controller includes a remote memory storing the adjustment information, the plurality of predetermined adjustment periods includes a first adjustment period and a second adjustment period, the remote controller has a first signal transmitting mode to transmit a first control signal including first adjustment information relating to the first adjustment period, and a second signal transmitting mode to transmit a second control signal including second adjustment information relating to the second adjustment period, and the remote controller is configured to change a mode of the remote controller between the first signal transmitting mode and the second signal transmitting mode.

18. A bicycle seatpost assembly comprising:

an electric actuator to change a state of the bicycle seatpost assembly between a lock state where a total length of the bicycle seatpost assembly is invariable, and an adjustable state where the total length of the bicycle seatpost assembly is variable, the adjustable state allows the total length to be adjustable by a user; and a seatpost controller configured to control, based on an adjustment period selected from a plurality of predetermined adjustment periods, the electric actuator to maintain the adjustable state during the selected adjustment period, wherein the seatpost controller is configured to control the electric actuator to maintain the adjustable state during the adjustment period based on a control signal from a remote controller, the control signal includes adjustment information relating to the adjustment period, the remote controller includes a remote memory storing the adjustment information, the remote controller is configured to communicate with an external device, and the seatpost controller is configured to control the electric actuator based on the adjustment period selected by using the external device from the plurality of predetermined adjustment periods stored in the remote memory.

* * * * *